(12) United States Patent
Sullivan et al.

(10) Patent No.: US 9,937,425 B2
(45) Date of Patent: *Apr. 10, 2018

(54) SYSTEM AND METHOD FOR MANAGING AUDIO AND VIDEO CHANNELS FOR VIDEO GAME PLAYERS AND SPECTATORS

(71) Applicant: Sony Interactive Entertainment America LLC, San Mateo, CA (US)

(72) Inventors: David R. Sullivan, San Rafael, CA (US); Robert McCool, Menlo Park, CA (US); Stephen G. Perlman, Palo Alto, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,068

(22) Filed: Jun. 6, 2017

(65) Prior Publication Data

US 2017/0266569 A1  Sep. 21, 2017

Related U.S. Application Data

(63) Continuation of application No. 15/138,043, filed on Apr. 25, 2016, now Pat. No. 9,687,746, which is a
(Continued)

(51) Int. Cl.
*G06F 19/00* (2011.01)
*A63F 13/86* (2014.01)
(Continued)

(52) U.S. Cl.
CPC ............ *A63F 13/86* (2014.09); *A63F 13/335* (2014.09); *A63F 13/35* (2014.09); *A63F 13/352* (2014.09); *A63F 13/355* (2014.09);
*A63F 13/358* (2014.09); *A63F 13/424* (2014.09); *A63F 13/537* (2014.09); *A63F 13/87* (2014.09); *A63F 2300/407* (2013.01); *A63F 2300/513* (2013.01); *A63F 2300/534* (2013.01);
(Continued)

(58) Field of Classification Search
CPC ....................................................... G06F 19/00
See application file for complete search history.

(56) References Cited

U.S. PATENT DOCUMENTS

| | | | |
|---|---|---|---|
| 2006/0058103 A1* | 3/2006 | Danieli | ................... A63F 13/12 463/42 |
| 2008/0081697 A1* | 4/2008 | Domville | ............ G10L 19/0018 463/42 |

* cited by examiner

*Primary Examiner* — Dmitry Suhol
*Assistant Examiner* — Ankit Doshi
(74) *Attorney, Agent, or Firm* — Martine Penilla Group, LLP

(57) ABSTRACT

A computer-implemented system and method are described for managing audio chat for an online video game or application. For example, a system according to one embodiment comprises: an online video game or application execution engine to execute an online video game or application in response to input from one or more users of the video game or application and to responsively generate audio and video of the video game or application; and a chat subsystem to establish audio chat sessions with the one or more users and one or more spectators to the video game or application, the chat subsystem establishing a plurality of audio chat channels including a spectator channel over which the spectators participate in audio chat and a user channel over which the users participate in audio chat.

22 Claims, 14 Drawing Sheets

Related U.S. Application Data continuation of application No. 13/495,904, filed on Jun. 13, 2012, now Pat. No. 9,339,728, which is a continuation-in-part of application No. 12/538,077, filed on Aug. 7, 2009, now Pat. No. 9,138,644, and a continuation-in-part of application No. 10/315,460, filed on Dec. 10, 2002, now Pat. No. 7,849,491.

(60) Provisional application No. 61/497,453, filed on Jun. 15, 2011, provisional application No. 61/210,888, filed on Mar. 23, 2009.

(51) Int. Cl.
*A63F 13/424* (2014.01)
*A63F 13/335* (2014.01)
*A63F 13/355* (2014.01)
*A63F 13/87* (2014.01)
*A63F 13/352* (2014.01)
*A63F 13/358* (2014.01)
*A63F 13/35* (2014.01)
*A63F 13/537* (2014.01)

(52) U.S. Cl.
CPC ... *A63F 2300/538* (2013.01); *A63F 2300/572* (2013.01); *A63F 2300/577* (2013.01); *A63F 2300/6072* (2013.01); *G06F 19/00* (2013.01)

SYSTEM AND METHOD FOR MANAGING AUDIO AND VIDEO CHANNELS FOR VIDEO GAME PLAYERS AND SPECTATORS

CLAIM OF PRIORITY

This application is a continuation of U.S. patent application Ser. No. 15/138,043, filed on Apr. 25, 2016, and entitled, "System and Method for Managing Audio and Video Channels for Video Game Players and Spectators," which is a continuation of U.S. patent application Ser. No. 13/495,904, filed Jun. 13, 2012, and entitled, "System and Method for Managing Audio and Video Channels for Video Game Players and Spectators" (since issued as U.S. Pat. No. 9,339,728 on May 17, 2016), which claims priority to U.S. Provisional Application No. 61/497,453, filed Jun. 15, 2011, entitled, "SYSTEM AND METHOD FOR MANAGING AUDIO AND VIDEO CHANNELS FOR VIDEO GAME PLAYERS AND SPECTATORS." U.S. patent application Ser. No. 13/495,904 is a continuation-in-part of U.S. patent application Ser. No. 12/538,077, filed Aug. 7, 2009, entitled "SYSTEM AND METHOD FOR ACCELERATED MACHINE SWITCHING" (since issued as U.S. Pat. No. 9,138,644 on Sep. 22, 2015), which claims priority to U.S. Provisional Application Ser. No. 61/210,888, filed Mar. 23, 2009. U.S. patent application Ser. No. 13/495,904 is a continuation-in-part (CIP) application of Ser. No. 10/315,460 filed Dec. 10, 2002 entitled, "APPARATUS AND METHOD FOR WIRELESS VIDEO GAMING," (since issued as U.S. Pat. No. 7,849,491 on Dec. 7, 2010) The disclosures of the above referenced applications are incorporated herein by reference in their entirety for all purposes.

BACKGROUND

1. Field of the Invention

The present disclosure relates generally to the field of data processing systems and particularly to a system and method for managing audio channels such as voice or video chat channels for computer games.

2. Description of the Related Art

Some current networked multi-player video games support audio communication between game participants. For example, the well known "Battlefield" franchise of first person shooter games allow participants to join a team with one or more other players and to communicate with the other members of the team using voice chat.

The video game program code used for multiplayer games is executed on each individual user's computer and audio communication channels are established between computers to enable voice chat. In this configuration, each user's voice is packetized at the client computer on which the user is playing the game and broadcast to all of the other players on the user's team. In some implementations, the voice is transmitted to a server which then redistributes the audio to each of the players.

However, current multi-player games provide limited control over the users to be included in verbal communication sessions. For example, inter-player communication is typically limited to team members and is not configurable on a player-by-player basis. Consequently, what is needed is a video gaming platform which provides for more configurable audio chat options. For example, it would be beneficial to allow users to open multiple audio chat communication channels with different categories of other players as well as non-players (e.g., spectators) of online video games.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a system and method for managing audio channels such as voice chat channels for computer games.

An Exemplary Online Video Game and Application Hosting System

Figure 1:
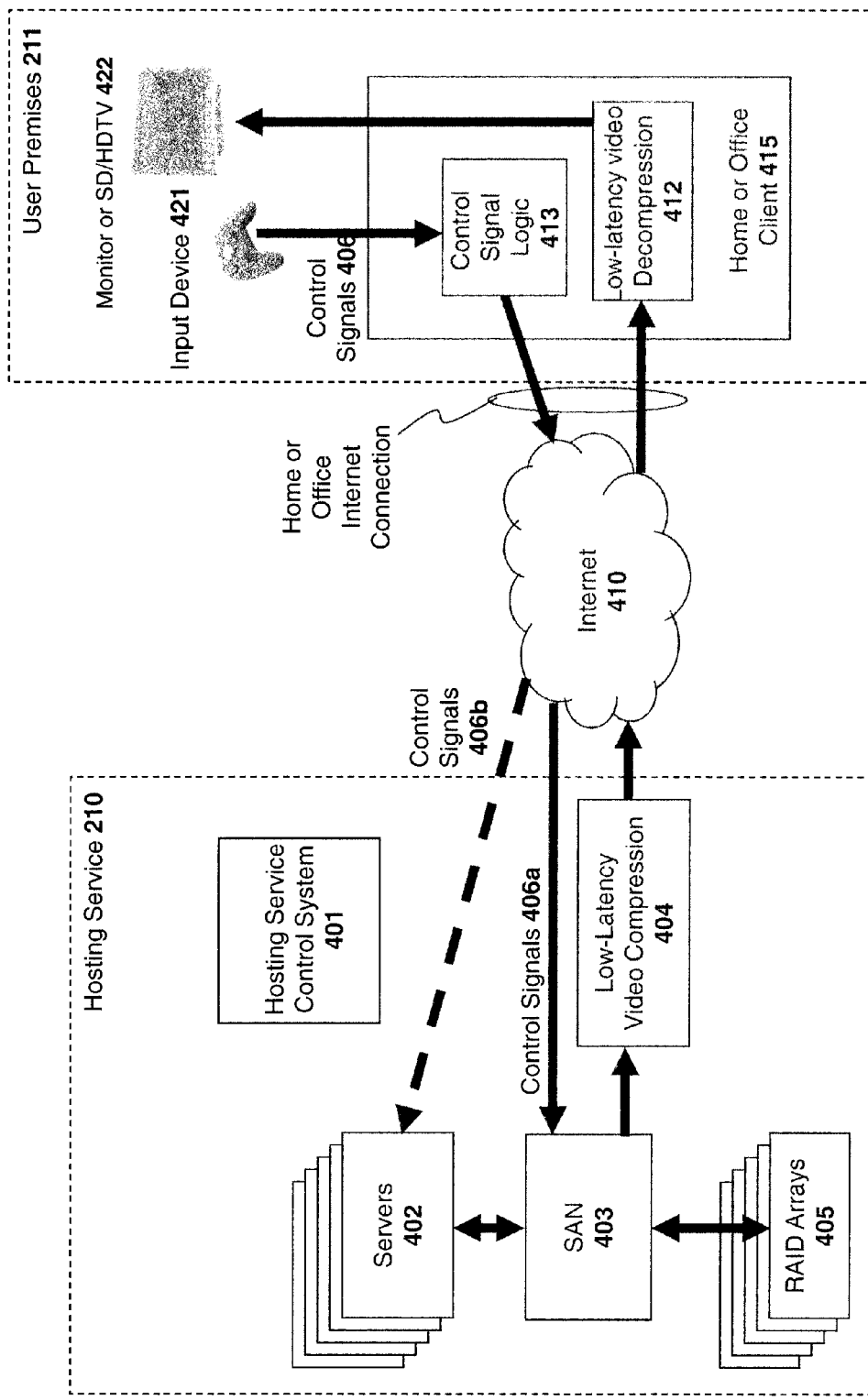
FIG. 1 illustrates a system architecture for executing online video games according to one embodiment of the invention.

FIG. 1 illustrates one embodiment of a video game/application Hosting Service 210 described in the co-pending applications. The Hosting Service 210 hosts applications running on Servers 402, that accept input from an input device 421, received by Home or Office Client 415, and sent through the Internet 410 to Hosting Service 210. The Servers 402 are responsive to the input, and update their video and audio output accordingly which is compressed through Low-Latency Video Compression 404. The compressed video is then streamed through the Internet 410 to be decompressed by the Home or Office Client 415, and then displayed on Monitor or SD/HDTV 422. This system is a low-latency streaming interactive video system as more thoroughly described in the aforementioned "co-pending applications." One of the primary features of this system is that the operations of transmitting control signals from the client 415 as the user plays the video game or uses the application (e.g., via a game controller or other input device), receiving the control signals and responsively executing the video game or application on one of the servers 402, compressing the resulting video content with low latency compression 404, and streaming the video content to the client where it decoded and rendered, occurs with a latency such that the user perceives that the video game or application is responding instantly to the control signals. In one embodiment described in the co-pending applications, this latency is a sub-100 ms latency, although the underlying principles of the invention are not limited to any particular latency value.

Figure 2:
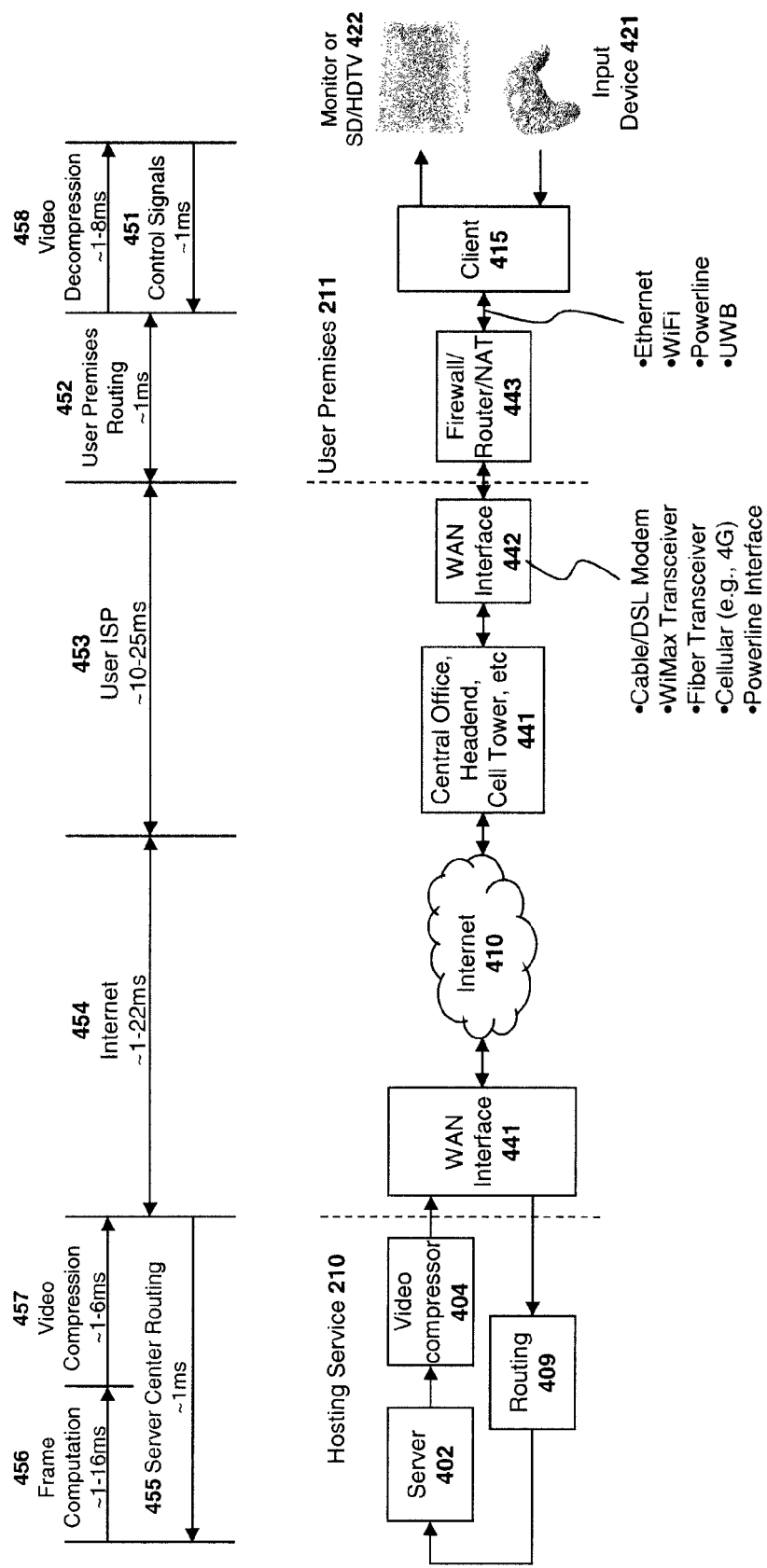
FIG. 2 illustrates different communication channels over which an online video game may be played in accordance with one embodiment of the invention.

As shown in FIG. 2, the network connection between the Hosting Service 210 Home and Office Client 415 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial sensors, position sensors, wands, video capture cameras and/or motion-tracking cameras, etc.), or they may use external input devices 421 (e.g., keyboards, mice, game controllers, inertial sensors, position senor, wands, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 415 receives control signals 406 from input device 421 from the user, and then it transmits the controller input through the Internet 410 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 410. The home or office client device then decodes the compressed video stream and renders the decompressed video images on a monitor or TV.

Consequently, the computing and graphical hardware requirements of the client device 415 are significantly reduced. The client 415 only needs to have the processing power to forward the input device 421 control signals 406 through the Internet 410 and decode and decompress a compressed video stream received from the Internet 410, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 415 do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 415 since its processing requirements will remain constant for a display resolution and frame rate with a given video decompression algorithm. Thus, the hardware limitations and compatibility issues seen today do not exist in the system illustrated in FIG. 1.

Further, because the game and application software executes only in servers in the hosting service 210, there never is a copy of the game or application software (either in the form of physical optical media such as a DVD-ROM, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

In one embodiment, the hosting service 210 provides software development tools to the game or application software developers (which refers generally to software development companies, game or movie studios, or game or applications software publishers) which design video games so that they may design games capable of being executed on the hosting service 210. Such tools allow developers to exploit features of the hosting service that would not normally be available in a standalone PC or game console (e.g., fast access to very large databases of complex geometry ("geometry" unless otherwise qualified shall be used herein to refer to polygons, textures, rigging, lighting, behaviors and other components and parameters that define 3D datasets)).

Different business models are possible under this architecture. Under one model, the hosting service 210 collects a subscription fee from the end user and pays a royalty to the developers. In an alternate implementation, the developers collect a subscription fee directly from the user and pays the hosting service 210 for hosting the game or application content. These underlying principles are not limited to any particular business model for providing online gaming or application hosting.

Figure 3:
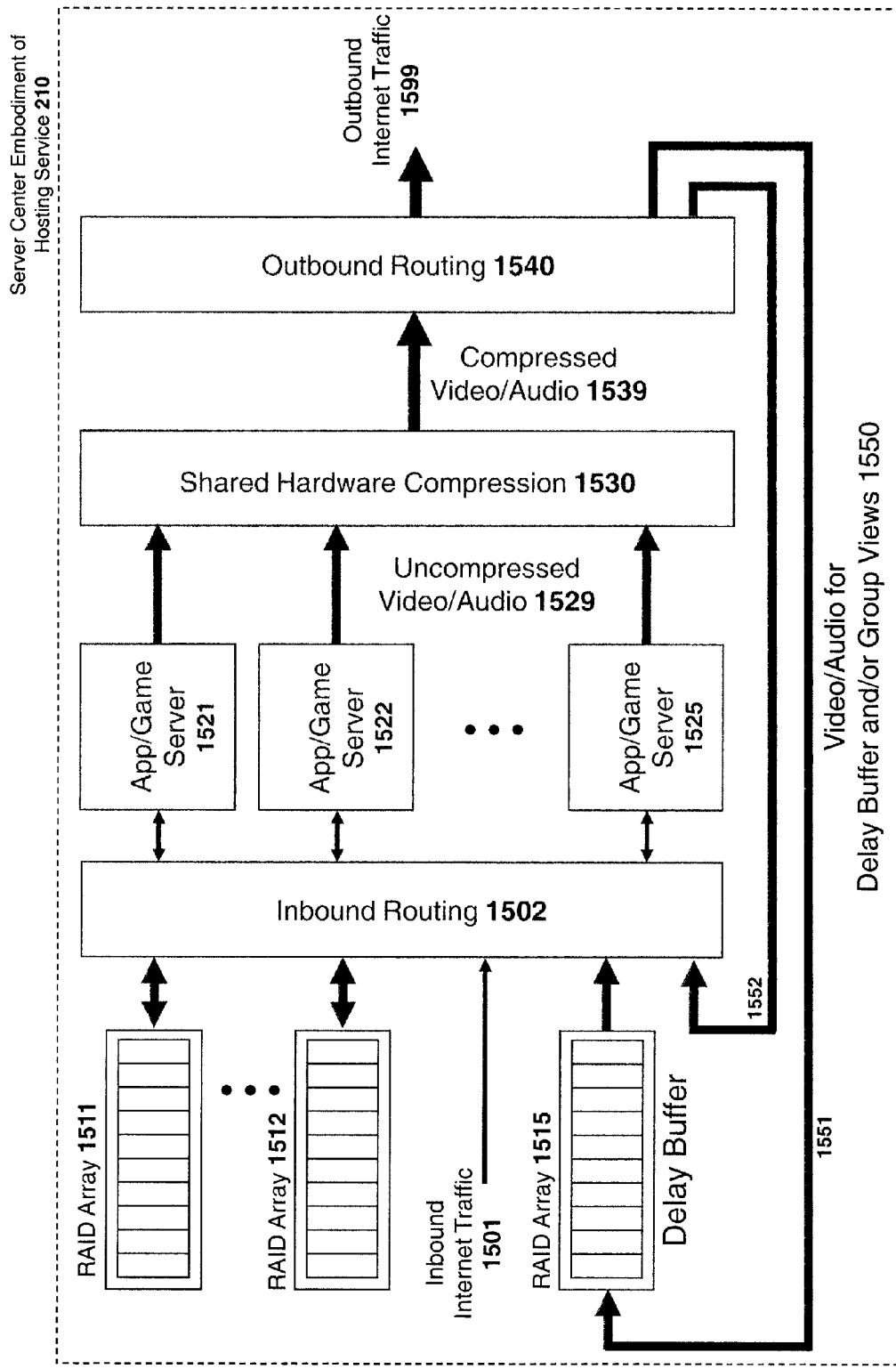
FIG. 3 illustrates one embodiment of a system architecture for compressing audio/video generated by a video game.

FIG. 3 illustrates an embodiment of components of a server center for hosting service 210 utilized in the following feature descriptions. Inbound internet traffic 1501 from user clients 415 is directed to inbound routing 1502. Typically, inbound internet traffic 1501 will enter the server center via a high-speed fiber optic connection to the Internet, but any network connection means of adequate bandwidth, reliability and low latency will suffice. Inbound routing 1502 is a system of network (the network can be implemented as an Ethernet network, a fiber channel network, or through any other transport means) switches and routing servers supporting the switches which takes the arriving packets and routes each packet to the appropriate application/game ("app/game") server 1521-1525. In one embodiment, a packet which is delivered to a particular app/game server represents a subset of the data received from the client and/or may be translated/changed by other components (e.g., networking components such as gateways and routers) within the data center. In some cases, packets will be routed to more than one server 1521-1525 at a time, for example, if a game or application is running on multiple servers at once in parallel. RAID arrays 1511-1512 are connected to the inbound routing network 1502, such that the app/game servers 1521-1525 can read and write to the RAID arrays 1511-1512. Further, a RAID array 1515 (which may be implemented as multiple RAID arrays) is also connected to the inbound routing 1502 and data from RAID array 1515 can be read from app/game servers 1521-1525. The inbound routing 1502 may be implemented in a wide range of prior art network architectures, including a tree structure of switches, with the inbound internet traffic 1501 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 1521-1525 may each have multiple network connections to the inbound routing 1502. For example, a server 1521-1525 may have a network connection to a subnet attached to RAID Arrays 1511-1512 and another network connection to a subnet attached to other devices.

The app/game servers 1521-1525 may all be configured the same, some differently, or all differently, as previously described in relation to servers 402 in the embodiment illustrated in FIG. 1. In one embodiment, each user, when using the hosting service is typically using at least one app/game server 1521-1525. For the sake of simplicity of explanation, we shall assume a given user is using app/game server 1521, but multiple servers could be used by one user, and multiple users could share a single app/game server 1521-1525. The user's control input, sent from client 415 as previously described is received as inbound Internet traffic 1501, and is routed through inbound routing 1502 to app/game server 1521. App/game server 1521 uses the user's control input as control input to the game or application running on the server, and computes the next frame of video and the audio associated with it. App/game server 1521 then outputs the uncompressed video/audio 1529 to shared video compression 1530. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 1530 compresses the uncompressed video and audio from the app/game servers 1521-1525. The compression maybe implemented entirely in hardware, or in hardware running software. There may a dedicated compressor for each app/game server 1521-1525, or if the compressors are fast enough, a given compressor can be used to compress the video/audio from more than one app/game server 1521-1525. For example, at 60 fps a video frame time is 16.67 ms. If a compressor is able to compress a frame in 1 ms, then that compressor could be used to compress the video/audio from as many as 16 app/game servers 1521-1525 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 1530 with shared storage means (e.g., RAM, Flash) for storing the state of each compression process, and when a server 1521-1525 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 1521-1525 supporting each user monitoring data sent from the client 415, the app/game server 1521-1525 sends the relevant information to the shared hardware compression 1530.

The shared hardware compression 1530 also packetizes the compressed video/audio using means such as those previously described, and if appropriate, applying FEC codes, duplicating certain data, or taking other steps to as to adequately ensure the ability of the video/audio data stream to be received by the client 415 and decompressed with as high a quality and reliability as feasible.

Some applications, such as those described below, require the video/audio output of a given app/game server 1521-1525 to be available at multiple resolutions (or in other multiple formats) simultaneously. If the app/game server 1521-1525 so notifies the shared hardware compression 1530 resource, then the uncompressed video audio 1529 of that app/game server 1521-1525 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 1539 of all of the various resolutions and formats required for a given app/game server 1521-1525 (be it one or many) will be output at once to outbound routing 1540. In one embodiment the output of the compressed video/audio 1539 is in UDP format, so it is a unidirectional stream of packets.

The outbound routing network 1540 comprises a series of routing servers and switches which direct each compressed video/audio stream to the intended user(s) or other destinations through outbound Internet traffic 1599 interface (which typically would connect to a fiber interface to the Internet) and/or back to the delay buffer 1515, and/or back to the inbound routing 1502, and/or out through a private network (not shown) for video distribution. Note that (as described below) the outbound routing 1540 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 1540. The multiple destinations of the broadcast may be to multiple users' clients 415 via the Internet, to multiple app/game servers 1521-1525 via inbound routing 1502, and/or to one or more delay buffers 1515. Thus, the output of a given server 1521-1522 is compressed into one or multiple formats, and each compressed stream is directed to one or multiple destinations.

Further, in another embodiment, if multiple app/game servers 1521-1525 are used simultaneously by one user (e.g., in a parallel processing configuration to create the 3D output of a complex scene) and each server is producing part of the resulting image, the video output of multiple servers 1521-1525 can be combined by the shared hardware compression 1530 into a combined frame, and from that point forward it is handled as described above as if it came from a single app/game server 1521-1525.

Note that in one embodiment, a copy (in at least the resolution or higher of video viewed by the user) of all video generated by app/game servers 1521-1525 is recorded in delay buffer 1515 for at least some number of minutes (15 minutes in one embodiment). This allows each user to "rewind" the video from each session in order to review previous work or exploits (in the case of a game). Thus, in one embodiment, each compressed video/audio output 1539 stream being routed to a user client 415 is also being multicasted to a delay buffer 1515. When the video/audio is stored on a delay buffer 1515, a directory on the delay buffer 1515 provides a cross reference between the network address of the app/game server 1521-1525 that is the source of the delayed video/audio and the location on the delay buffer 1515 where the delayed video/audio can be found.

Figure 4:
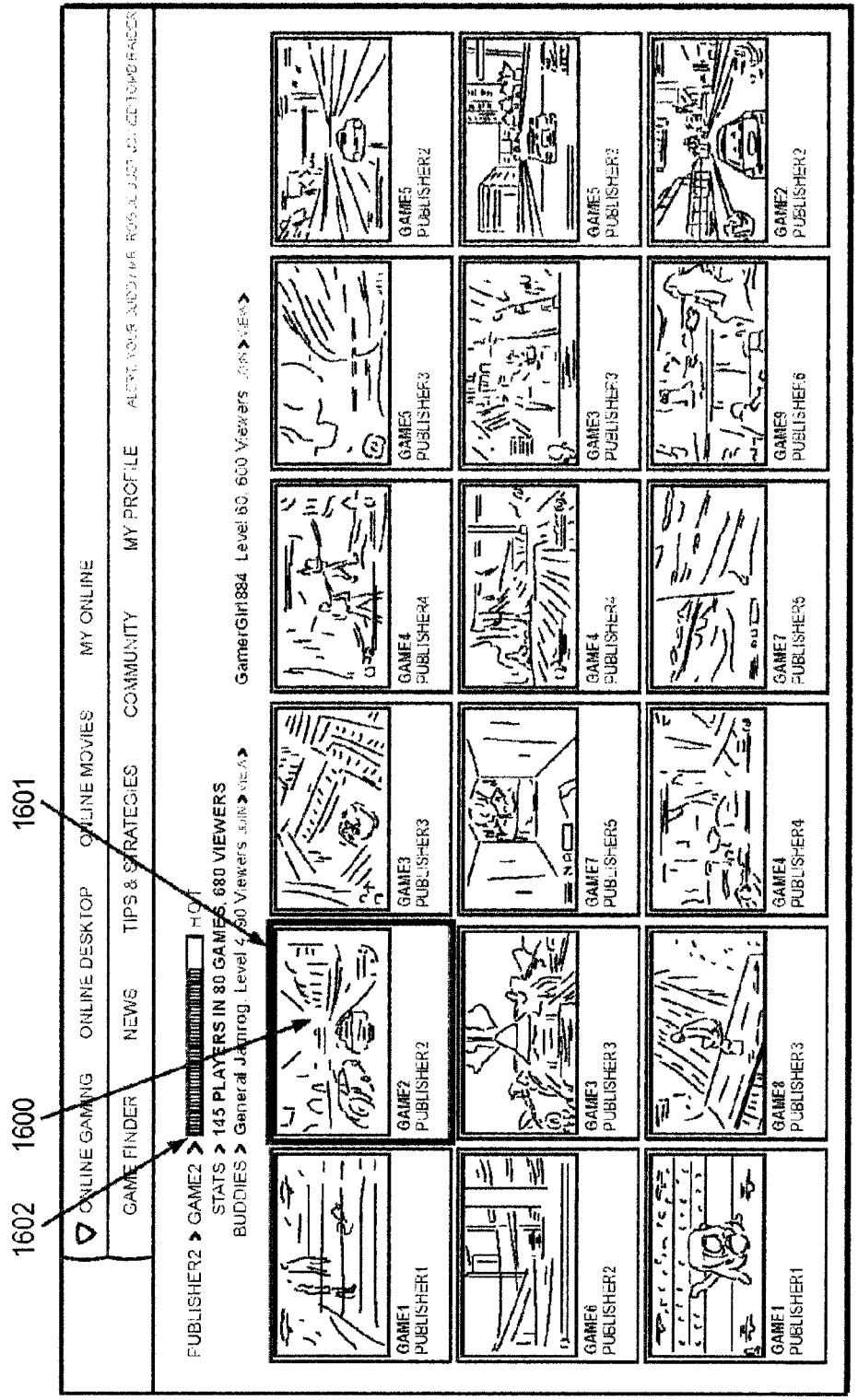
FIGS. 4-8 illustrate embodiments of a graphical user interface (GUI) for navigating a video game hosting service and viewing online video games.

App/game servers 1521-1525 may not only be used for running a given application or video game for a user, but they may also be used for creating the user interface applications for the hosting service 210 that supports navigation through hosting service 210 and other features. A screen shot of one such user interface application is shown in FIG. 4, a "Game Finder" screen. This particular user interface screen allows a user to watch 15 games that are being played live (or delayed) by other users. Each of the "thumbnail" video windows, such as 1600 is a live video window in motion showing the video from one user's game. The view shown in the thumbnail may be the same view that the user is seeing, or it may be a delayed view (e.g., if a user is playing a combat game, a user may not want other users to see where she is hiding and she may choose to delay any view of her gameplay by a period of time, say 10 minutes). The view may also be a camera view of a game that is different from any user's view. Through menu selections (not shown in this illustration), a user may choose a selection of games to view at once, based on a variety of criteria. As a small sampling of exemplary choices, the user may select a random selection of games, all of one kind of games (all being played by different players), only the top-ranked players of a game, players at a given level in the game, or lower-ranked players (e.g., if the player is learning the basics), players who are "buddies" (or are rivals), games that have the most number of viewers, etc.

Note that generally, each user will decide whether the video from his or her game or application can be viewed by others and, if so, which others, and when it may be viewed by others, whether it is only viewable with a delay.

The app/game server 1521-1525 that is generating the user interface screen shown in FIG. 4 acquires the 15 video/audio feeds by sending a message to the app/game server 1521-1525 for each user whose game it is requesting from. The message is sent through the inbound routing 1502 or another network. The message will include the size and format of the video/audio requested, and will identify the user viewing the user interface screen. A given user may choose to select "privacy" mode and not permit any other users to view video/audio of his game (either from his point of view or from another point of view), or as described in the previous paragraph, a user may choose to allow viewing of video/audio from her game, but delay the video/audio viewed. A user app/game server 1521-1525 receiving and accepting a request to allow its video/audio to be viewed will acknowledge as such to the requesting server, and it will also notify the shared hardware compression 1530 of the need to generate an additional compressed video stream in the requested format or screen size (assuming the format and screen size is different than one already being generated), and it will also indicate the destination for the compressed video (i.e., the requesting server). If the requested video/audio is only delayed, then the requesting app/game server 1521-1525 will be so notified, and it will acquire the delayed video/audio from a delay buffer 1515 by looking up the video/audio's location in the directory on the delay buffer 1515 and the network address of the app/game server 1521-1525 that is the source of the delayed video/audio. Once all of these requests have been generated and handled, up to 15 live thumbnail-sized video streams will be routed from the outbound routing 1540 to the inbound routing 1502 to the app/game server 1521-1525 generating the user interface screen, and will be decompressed and displayed by the server. Delayed video/audio streams may be in too large a screen size, and if so, the app/game server 1521-1525 will decompress the streams and scale down the video streams to thumbnail size. In one embodiment, requests for audio/video are sent to (and managed by) a central "management" service similar to the hosting service control system of FIG. 1 which then redirects the requests to the appropriate app/game server 1521-1525. Moreover, in one embodiment, no request may be required because the thumbnails are "pushed" to the clients of those users that allow it.

The audio from 15 games all mixed simultaneously might create a cacophony of sound. The user may choose to mix all of the sounds together in this way (perhaps just to get a sense of the "din" created by all the action being viewed), or the user may choose to just listen to the audio from one game at a time. The selection of a single game is accomplished by moving the yellow selection box 1601 (appearing as a black rectangular outline in the black-and-white rendering of FIG. 4) to a given game (the yellow box movement can be accomplished by using arrow keys on a keyboard, by moving a mouse, by moving a joystick, or by pushing directional buttons on another device such as a mobile phone). Once a single game is selected, just the audio from that game plays. Also, game information 1602 is shown. In the case of this game, for example, the publisher logo (e.g., "EA" for "Electronic Arts") and the game logo, e.g., "Need for Speed Carbon" and an orange horizontal bar (rendered in FIG. 4 as a bar with vertical stripes) indicates in relative terms the number of people playing or viewing the game at that particular moment (many, in this case, so the game is "Hot"). Further "Stats" (i.e. statistics) are provided, indicating that there are 145 players actively playing 80 different instantiations of the Need for Speed Game (i.e., it can be played either by an individual player game or multiplayer game), and there are 680 viewers (of which this user is one). Note that these statistics (and other statistics) are collected by hosting service control system 401 and are stored on RAID arrays 1511-1512, for keeping logs of the hosting service 210 operation and for appropriately billing users and paying publishers who provide content. Some of the statistics are recorded due to actions by the service control system 401, and some are reported to the service control system 401 by the individual app/game server 1521-1525. For example, the app/game server 1521-1525 running this Game Finder application sends messages to the hosting service control system 401 when games are being viewed (and when they are ceased to be viewed) so that it may update the statistics of how many games are in view. Some of the statistics are available for user interface applications such as this Game Finder application.

Figure 5:
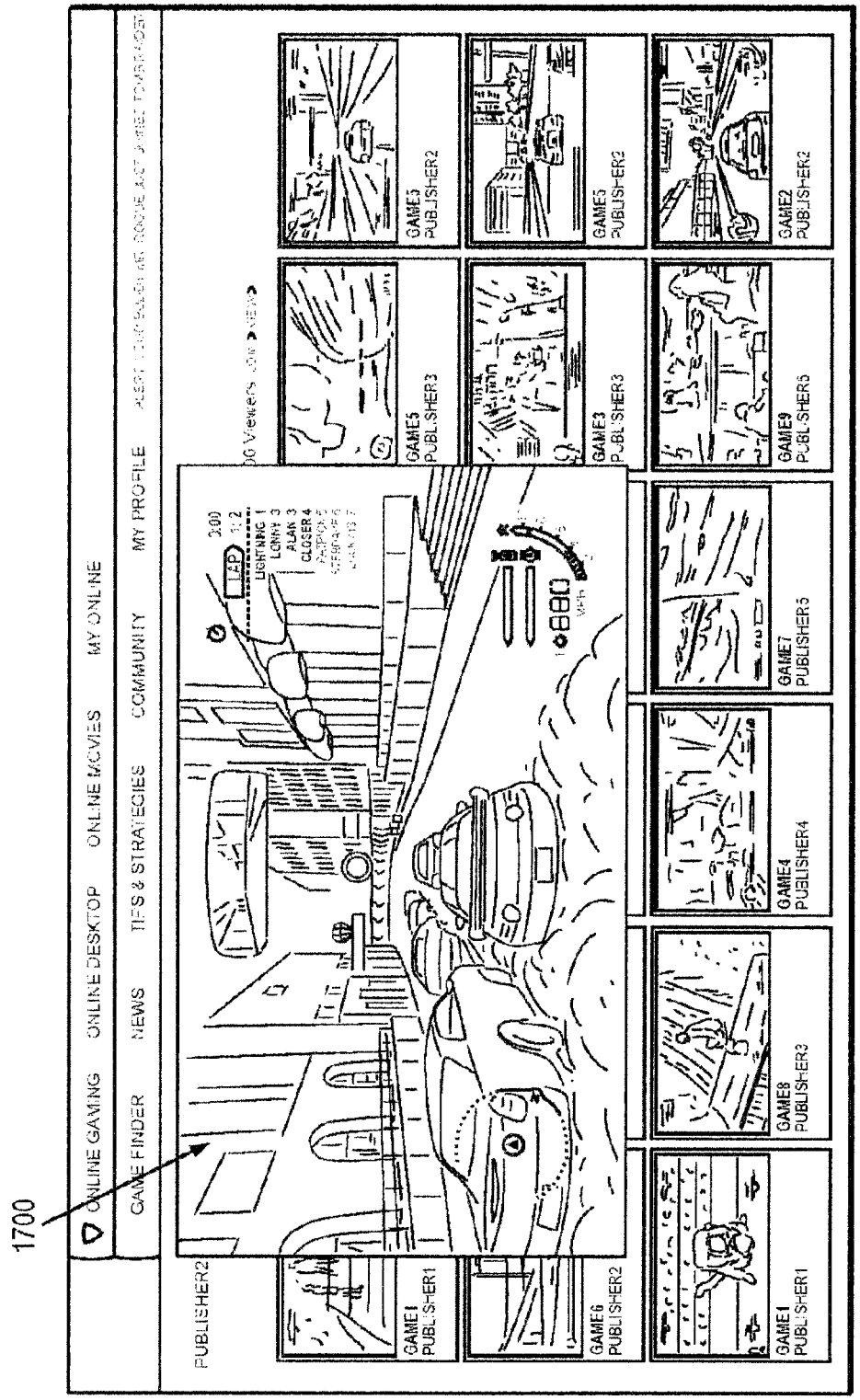

If the user clicks an activation button on their input device, they will see the thumbnail video in the yellow box zoom up while continuing to play live video to full screen size. This effect is shown in process in FIG. 5. Note that video window 1700 has grown in size. To implement this effect, the app/game server 1521-1525 requests from the app/game server 1521-1525 running the game selected to have a copy of the video stream for a full screen size (at the resolution of the user's display device 422) of the game routed to it. The app/game server 1521-1525 running the game notifies the shared hardware compressor 1530 that a thumbnail-sized copy of the game is no longer needed (unless another app/game server 1521-1525 requires such a thumbnail), and then it directs it to send a full-screen size copy of the video to the app/game server 1521-1525 zooming the video. The user playing the game may or may not have a display device 422 that is the same resolution as that of the user zooming up the game. Further, other viewers of the game may or may not have display devices 422 that are the same resolution as the user zooming up the game (and may have different audio playback means, e.g., stereo or surround sound). Thus, the shared hardware compressor 1530 determines whether a suitable compressed video/audio stream is already being generated that meets the requirements of the user requesting the video/audio stream and if one does exist, it notifies the outbound routing 1540 to route a copy of the stream to the app/game server 1521-1525 zooming the video, and if not compresses another copy of the video that is suitable for that user and instructs the outbound routing to send the stream back to the inbound routing 1502 and the app/game server 1521-1525 zooming the video. This server, now receiving a full screen version of the selected video will decompress it and gradually scale it up to full size.

Figure 6:
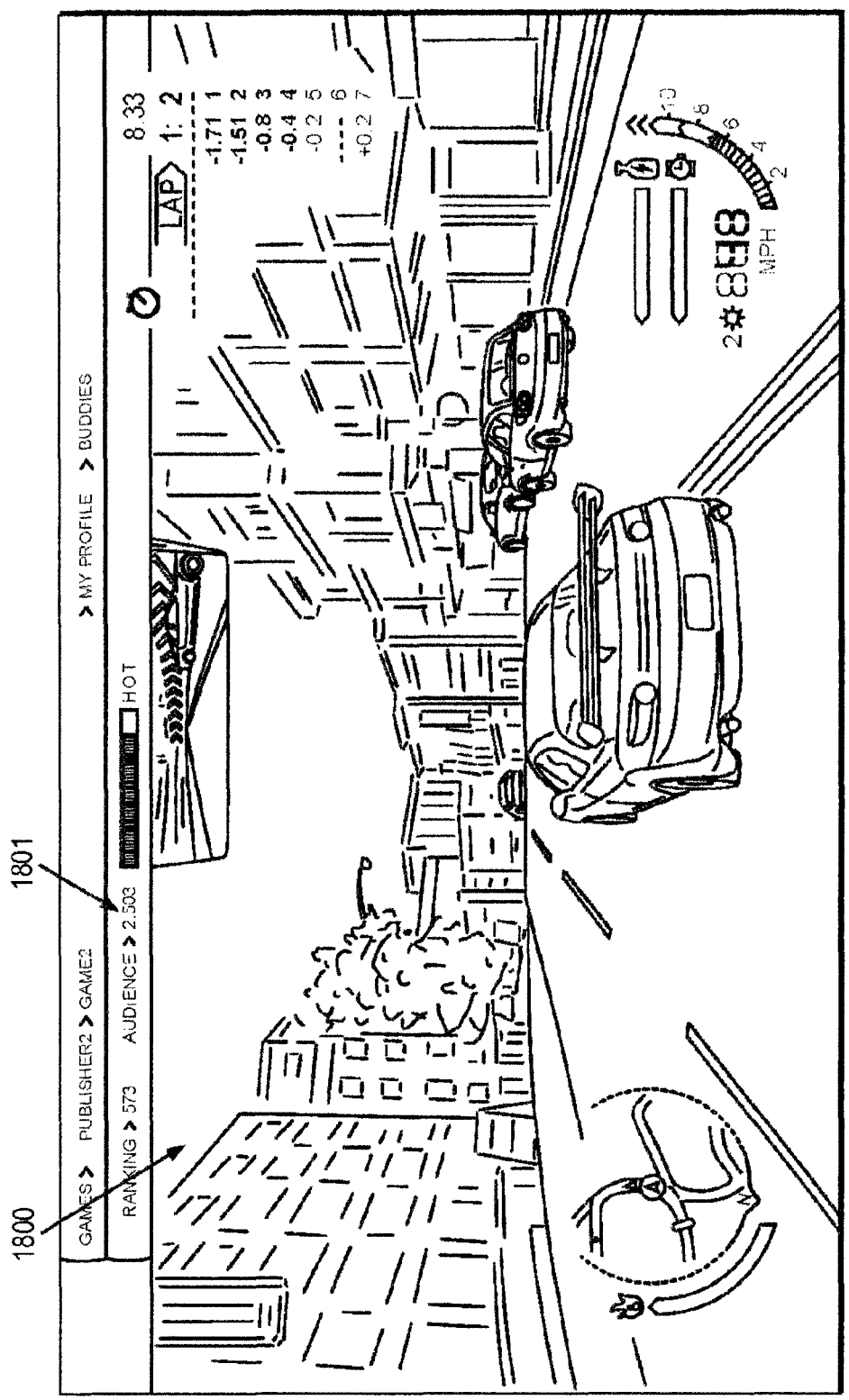

FIG. 6 illustrates how the screen looks after the game has completely zoomed up to full screen and the game is shown at the full resolution of the user's display device 422 as indicated by the image pointed to by arrow 1800. The app/game server 1521-1525 running the game finder application sends messages to the other app/game servers 1521-1525 that had been providing thumbnails that they are no longer needed and messages to the hosting service control server 401 that the other games are no longer being viewed. At this point the only display it is generating is an overlay 1801 at the top of the screen which provides information and menu controls to the user. Note that as this game has progressed, the audience has grown to 2,503 viewers. With so many viewers, there are bound to be many viewers with display devices 422 that have the same or nearly the same resolution (each app/game server 1521-1525 has the ability to scale the video for adjusting the fitting).

Because the game shown is a multiplayer game, the user may decide to join the game at some point. The hosting service 210 may or may not allow the user to join the game for a variety of reasons. For example, the user may have to pay to play the game and choose not to, the user may not have sufficient ranking to join that particular game (e.g., it would not be competitive for the other players), or the user's Internet connection may not have low enough latency to allow the user to play (e.g., there is not a latency constraint for viewing games, so a game that is being played far away (indeed, on another continent) can be viewed without latency concerns, but for a game to be played, the latency must be low enough for the user to (a) enjoy the game, and (b) be on equal footing with the other players who may have lower latency connections). If the user is permitted to play, then app/game server 1521-1525 that had been providing the Game Finder user interface for the user will request that the hosting service control server 401 initiate (i.e., locate and start up) an app/game server 1521-1525 that is suitably configured for playing the particular game to load the game from a RAID array 1511-1512, and then the hosting service control server 401 will instruct the inbound routing 1502 to transfer the control signals from the user to the app/game server now hosting the game and it will instruct the shared hardware compression 1530 to switch from compressing the video/audio from the app/game server that had been hosting the Game Finder application to compressing the video/audio from the app/game server now hosting the game. The vertical sync of the Game Finder app/game service and the new app/game server hosting the game are not synchronized, and as a result there is likely to be a time difference between the two syncs. Because the shared video compression hardware 1530 will begin compressing video upon an app/game server 1521-1525 completing a video frame, the first frame from the new server may be completed sooner than a full frame time of the old server, which may be before the prior compressed frame completing its transmission (e.g., consider transmit time 992 of FIG. 9*b*: if uncompressed frame 3 963 were completed half a frame time early, it would impinge upon the transmit time 992). In such a situation the shared video compression hardware 1530 will ignore the first frame from the new server (e.g., like Frame 4 964 is ignored 974), and the client 415 will hold the last frame from the old server an extra frame time, and the shared video compression hardware 1530 will begin compressing the next frame time video from the new app/game server hosting the game. Visually, to the user, the transition from one app/game server to the other will be seamless. The hosting service control server 401 will then notify app/game server 1521-1525 that had been hosting the Game Finder to switch to an idle state, until it is needed again.

The user then is able to play the game. And, what is exceptional is the game will play perceptually instantly (since it will have loaded onto the app/game server 1521-1525 from a RAID array 1511-1512 at gigabit/second speed), and the game will be loaded onto a server exactly suited for the game together with an operating system exactly configured for the game with the ideal drivers, registry configuration (in the case of Windows), and with no other applications running on the server that might compete with the game's operation.

Also, as the user progresses through the game, each of the segments of the game will load into the server at gigabit/second speed (i.e., 1 gigabyte loads in 8 seconds) from the RAID array 1511-1512, and because of the vast storage capacity of the RAID array 1511-1512 (since it is a shared resource among many users, it can be very large, yet still be cost effective), geometry setup or other game segment setup can be pre-computed and stored on the RAID array 1511-1512 and loaded extremely rapidly. Moreover, because the hardware configuration and computational capabilities of each app/game server 1521-1525 is known, pixel and vertex shaders can be pre-computed.

Thus, the game will start up almost instantly, it will run in an ideal environment, and subsequent segments will load almost instantly.

But, beyond these advantages, the user will be able to view others playing the game (via the Game Finder, previously described and other means) and both decide if the game is interesting, and if so, learn tips from watching others. And, the user will be able to demo the game instantly, without having to wait for a large download and/or installation, and the user will be able to play the game instantly, perhaps on a trial basis for a smaller fee, or on a longer term basis. And, the user will be able to play the game on a Windows PC, a Macintosh, on a television set, at home, when traveling, and even on a mobile phone, with a low enough latency wireless connection (although latency will not be an issue for just spectating). And, this can all be accomplished without ever physically owning a copy of the game.

As mentioned previously, the user can decide to not allow his gameplay to be viewable by others, to allow his game to be viewable after a delay, to allow his game to be viewable by selected users, or to allow his game to be viewable by all users. Regardless, the video/audio will be stored, in one embodiment, for 15 minutes in a delay buffer 1515, and the user will be able to "rewind" and view his prior game play, and pause, play it back slowly, fast forward, etc., just as he would be able to do had he been watching TV with a Digital Video Recorder (DVR). Although in this example, the user is playing a game, the same "DVR" capability is available if the user is using an application. This can be helpful in reviewing prior work and in other applications as detailed below. Further, if the game was designed with the capability of rewinding based on utilizing game state information, such that the camera view can be changed, etc., then this "3D DVR" capability will also be supported, but it will require the game to be designed to support it. The "DVR" capability using a delay buffer 1515 will work with any game or application, limited of course, to the video that was generated when the game or application was used, but in the case of games with 3D DVR capability, the user can control a "fly through" in 3D of a previously played segment, and have the delay buffer 1515 record the resulting video and have the game state of the game segment recorded. Thus, a particular "fly-through" will be recorded as compressed video, but since the game state will also be recorded, a different fly-through will be possible at a later date of the same segment of the game.

As described below, users on the hosting service 210 will each have a User Page, where they can post information about themselves and other data. Among of the things that users will be able to post are video segments from game play that they have saved. For example, if the user has overcome a particularly difficult challenge in a game, the user can "rewind" to just before the spot where they had their great accomplishment in the game, and then instruct the hosting service 210 to save a video segment of some duration (e.g., 30 seconds) on the user's User Page for other users to watch. To implement this, it is simply a matter of the app/game server 1521-1525 that the user is using to playback the video stored in a delay buffer 1515 to a RAID array 1511-1512 and then index that video segment on the user's User Page.

If the game has the capability of 3D DVR, as described above, then the game state information required for the 3D DVR can also be recorded by the user and made available for the user's User Page.

In the event that a game is designed to have "spectators" (i.e., users that are able to travel through the 3D world and observe the action without participating in it) in addition to active players, then the Game Finder application will enable users to join games as spectators as well as players. From an implementation point of view, there is no difference to the hosting system 210 to if a user is a spectator instead of an active player. The game will be loaded onto an app/game server 1521-1525 and the user will be controlling the game (e.g., controlling a virtual camera that views into the world). The only difference will be the game experience of the user.

Another feature of the hosting service 210 is the ability for multiple users to collaborate while viewing live video, even if using widely disparate devices for viewing. This is useful both when playing games and when using applications.

Many PCs and mobile phones are equipped with video cameras and have the capability to do real-time video compression, particularly when the image is small. Also, small cameras are available that can be attached to a television, and it is not difficult to implement real-time compression either in software or using one of many hardware compression devices to compress the video. Also, many PCs and all mobile phones have microphones, and headsets are available with microphones.

Figure 7:
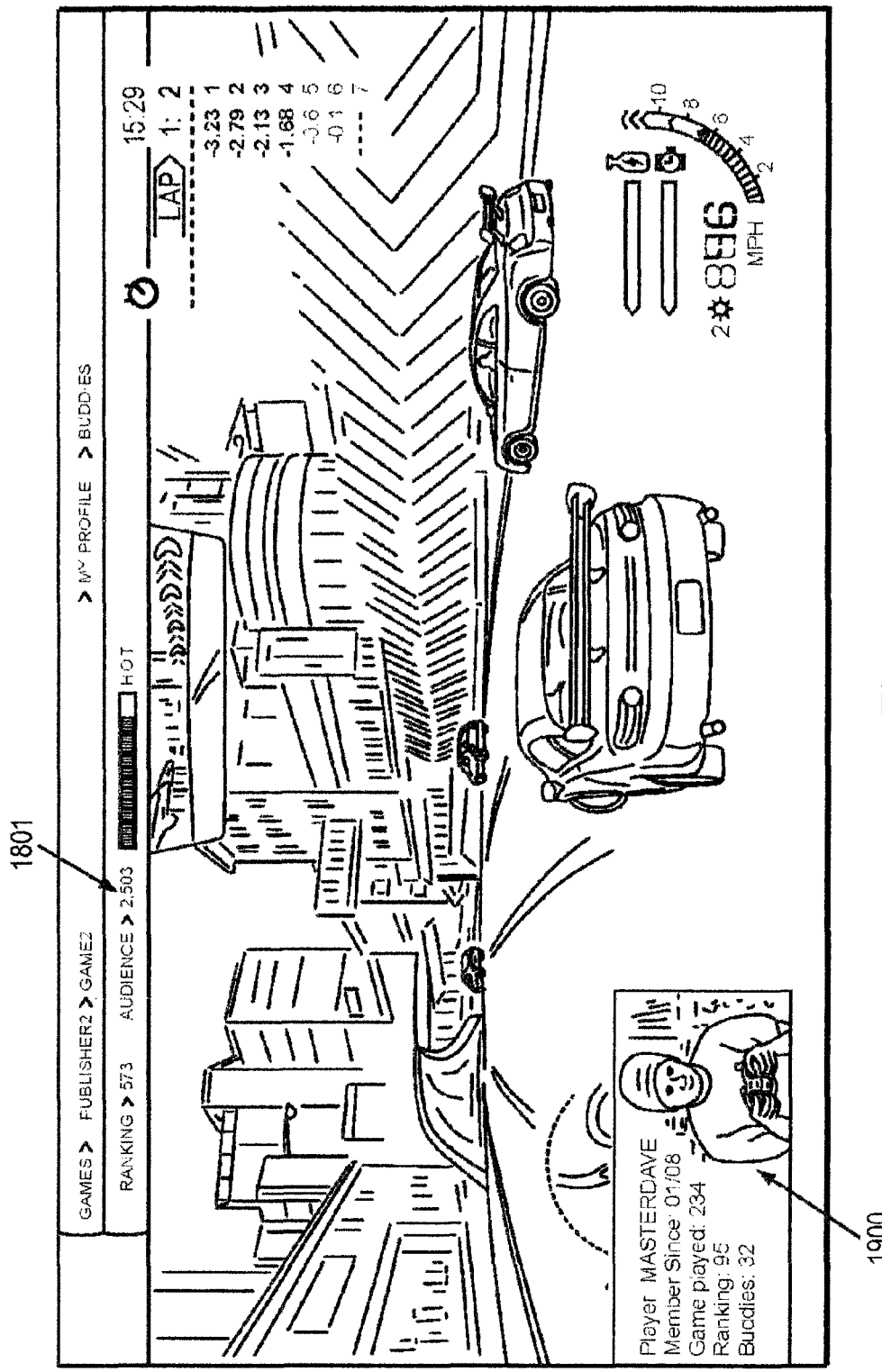

Such cameras and/or microphones, combined with local video/audio compression capability (particularly employing the low latency video compression techniques described herein) will enable a user to transmit video and/or audio from the user premises 211 to the hosting service 210, together with the input device control data. When such techniques are employed, then a capability illustrated in FIG. 7 is achievable: a user can have his video and audio 1900 appear on the screen within another user's game or application. This example is a multiplayer game, where teammates collaborate in a car race. A user's video/audio could be selectively viewable/hearable only by their teammates. And, since there would be effectively no latency, using the techniques described above the players would be able to talk or make motions to each other in real-time without perceptible delay.

This video/audio integration is accomplished by having the compressed video and/or audio from a user's camera/microphone arrive as inbound internet traffic 1501. Then the inbound routing 1502 routes the video and/or audio to the app/game servers 1521-1525 that are permitted to view/hear the video and/or audio. Then, the users of the respective app/game servers 1521-1525 that choose to use the video and/or audio decompress it and integrate as desired to appear within the game or application, such as illustrated by 1900.

The example of FIG. 7 shows how such collaboration is used in a game, but such collaboration can be an immensely powerful tool for applications. Consider a situation where a large building is being designed for New York city by architects in Chicago for a real estate developer based in New York, but the decision involves a financial investor who is traveling and happens to be in an airport in Miami, and a decision needs to be made about certain design elements of the building in terms of how it fits in with the buildings near it, to satisfy both the investor and the real estate developer. Assume the architectural firm has a high resolution monitor with a camera attached to a PC in Chicago, the real estate developer has a laptop with a camera in New York, and the investor has a mobile phone with a camera in Miami. The architectural firm can use the hosting service 210 to host a powerful architectural design application that is capable of highly realistic 3D rendering, and it can make use of a large database of the buildings in New York City, as well as a database of the building under design. The architectural design application will execute on one, or if it requires a great deal of computational power on several, of the app/game servers 1521-1525. Each of the 3 users at disparate locations will connect to the hosting service 210, and each will have a simultaneous view of the video output of the architectural design application, but it will be will appropriately sized by the shared hardware compression 1530 for the given device and network connection characteristics that each user has (e.g., the architectural firm may see a 2560×1440 60 fps display through a 20 Mbps commercial Internet connection, the real estate developer in New York may see a 1280×720 60 fps image over a 6 Mbps DSL connection on his laptop, and the investor may see a 320×180 60 fps image over a 250 Kbps cellular data connection on her mobile phone. Each party will hear the voice of the other parties (the conference calling will be handled by any of many widely available conference calling software package in the app/game server(s) 1521-1525) and, through actuation of a button on a user input device, a user will be able to make video appear of themselves using their local camera. As the meeting proceeds, the architects will be able to show what the build looks like as they rotate it and fly by it next to the other building in the area, with extremely photorealistic 3D rendering, and the same video will be visible to all parties, at the resolution of each party's display device. It won't matter that none of the local devices used by any party is incapable of handling the 3D animation with such realism, let alone downloading or even storing the vast database required to render the surrounding buildings in New York City. From the point of view of each of the users, despite the distance apart, and despite the disparate local devices they simply will have a seamless experience with an incredible degree of realism. And, when one party wants their face to be seen to better convey their emotional state, they can do so. Further, if either the real estate develop or the investor want to take control of the architectural program and use their own input device (be it a keyboard, mouse, keypad or touch screen), they can, and it will respond with no perceptual latency (assuming their network connection does not have unreasonable latency). For example, in the case of the mobile phone, if the mobile phone is connected to a WiFi network at the airport, it will have very low latency. But if it is using the cellular data networks available today in the US, it probably will suffer from a noticeable lag. Still, for most of the purposes of the meeting, where the investor is watching the architects control the building fly-by or for talking of video teleconferencing, even cellular latency should be acceptable.

Finally, at the end of the collaborative conference call, the real estate developer and the investor will have made their comments and signed off from the hosting service, the architectural firm will be able to "rewind" the video of the conference that has been recorded on a delay buffer 1515 and review the comments, facial expressions and/or actions applied to the 3D model of the building made during the meeting. If there are particular segments they want to save, those segments of video/audio can be moved from delay buffer 1515 to a RAID array 1511-1512 for archival storage and later playback.

Also, from a cost perspective, if the architects only need to use the computation power and the large database of New York City for a 15 minute conference call, they need only pay for the time that the resources are used, rather than having to own high powered workstations and having to purchase an expensive copy of a large database.

Figure 8:
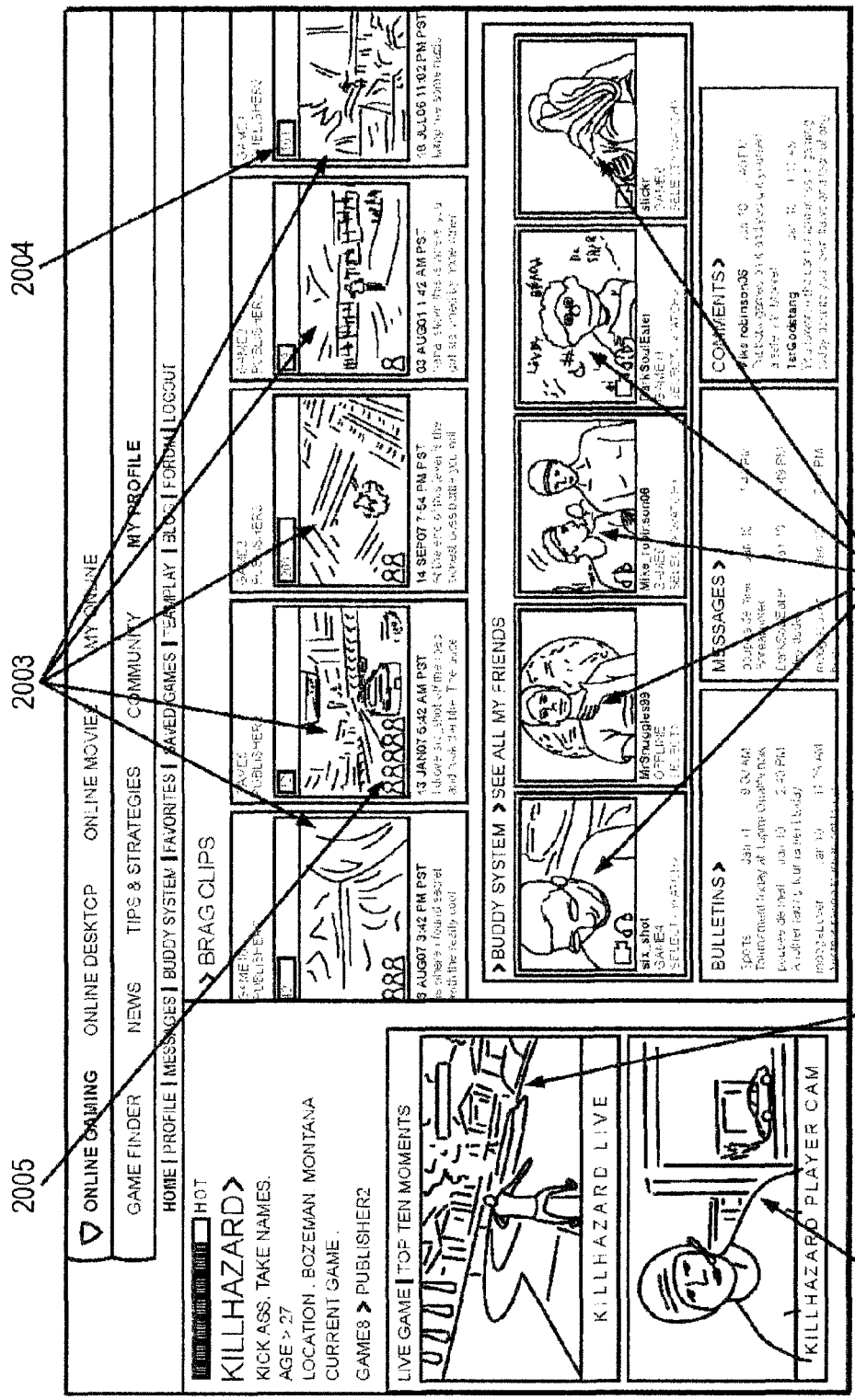

As illustrated in FIG. 8, using a video camera or by uploading video, the user (whose username is "KILLHAZARD") is able to post a video of himself 2000 that other users can view. The video is stored on a RAID array 1511-1512. Also, when other users come to KILLHAZARD's User Page, if KILLHAZARD is using the hosting service 210 at the time, live video 2001 of whatever he is doing (assuming he permits users viewing his User Page to watch him) will be shown. This will be accomplished by app/game server 1521-1525 hosting the User Page application requesting from the service control system 401 whether KILLHAZARD is active and if so, the app/game server 1521-1525 he is using. Then, using the same methods used by the Game Finder application, a compressed video stream in a suitable resolution and format will be sent to the app/game server 1521-1525 running the User Page application and it will be displayed. If a user selects the window with KILLHAZARD's live gameplay, and then appropriately clicks on their input device, the window will zoom up (again using the same methods as the Game Finder applications, and the live video will fill the screen, at the resolution of the watching user's display device 422, appropriate for the characteristics of the watching user's Internet connection.

A key advantage of this over prior art approaches is the user viewing the User Page is able to see a game played live that the user does not own, and may very well not have a local computer or game console capable of playing the game. It offers a great opportunity for the user to see the user shown in the User Page "in action" playing games, and it is an opportunity to learn about a game that the viewing user might want to try or get better at.

Camera-recorded or uploaded video clips from KILLHAZARD's buddies 2002 are also shown on the User Page, and underneath each video clip is text that indicates whether the buddy is online playing a game (e.g., six_shot is playing the game "Eragon" (shown here as Game4) and MrSnuggles99 is Offline, etc.). By clicking on a menu item (not shown) the buddy video clips switch from showing recorded or uploaded videos to live video of what the buddies who are currently playing games on the hosting service 210 are doing at that moment in their games. So, it becomes a Game Finder grouping for buddies. If a buddy's game is selected and the user clicks on it, it will zoom up to full screen, and the user will be able to watch the game played full screen live.

Again, the user viewing the buddy's game does not own a copy of the game, nor the local computing/game console resources to play the game. The game viewing is effectively instantaneous.

As previously described above, when a user plays a game on the hosting service 210, the user is able to "rewind" the game and find a video segment he wants to save, and then saves the video segment to his User Page. These are called "Brag Clips™". The video segments 2003 are all Brag Clips 2003 saved by KILLHAZARD from previous games that he has played. Number 2004 shows how many times a Brag Clip has been viewed, and when the Brag Clip is viewed, users have an opportunity to rate them, and the number of orange (shown here as black outlines) keyhole-shaped icons 2005 indicate how high the rating is. The Brag Clips 2003 loop constantly when a user views the User Page, along with the rest of the video on the page. If the user selects and clicks on one of the Brag Clips 2003, it zooms up to present the Brag Clip 2003, along with DVR controls to allow the clip to be played, paused, rewound, fast-forwarded, stepped through, etc.

The Brag Clip 2003 playback is implemented by the app/game server 1521-1525 loading the compressed video segment stored on a RAID array 1511-1512 when the user recorded the Brag Clip and decompressing it and playing it back.

Brag Clips 2003 can also be "3D DVR" video segments (i.e., a game state sequence from the game that can be replayed and allows the user to change the camera viewpoint) from games that support such capability. In this case the game state information is stored, in addition to a compressed video recording of the particular "fly through" the user made when the game segment was recorded. When the User Page is being viewed, and all of the thumbnails and video windows are constantly looping, a 3D DVR Brag Clip 2003 will constantly loop the Brag Clip 2003 that was recorded as compressed video when the user recorded the "fly through" of the game segment. But, when a user selects a 3D DVR Brag Clip 2003 and clicks on it, in addition to the DVR controls to allow the compressed video Brag Clip to be played, the user will be able to click on a button that gives them 3D DVR capability for the game segment. They will be able to control a camera "fly through" during the game segment on their own, and, if they wish (and the user who owns the user page so allows it) they will be able to record an alternative Brag Clip "fly through" in compressed video form will then be available to other viewers of the user page (either immediately, or after the owner of the user page has a chance to the review the Brag Clip).

This 3D DVR Brag Clip 2003 capability is enabled by activating the game that is about to replay the recorded game state information on another app/game server 1521-1525. Since the game can be activated almost instantaneously (as previously described) it is not difficult to activate it, with its play limited to the game state recorded by the Brag Clip segment, and then allow the user to do a "fly through" with a camera while recording the compressed video to a delay buffer 1515. Once the user has completed doing the "fly through" the game is deactivated.

From the user's point of view, activating a "fly through" with a 3D DVR Brag Clip 2003 is no more effort than controlling the DVR controls of a linear Brag Clip 2003. They may know nothing about the game or even how to play the game. They are just a virtual camera operator peering into a 3D world during a game segment recorded by another.

Users will also be able to overdub their own audio onto Brag Clips that is either recorded from microphones or uploaded. In this way, Brag Clips can be used to create custom animations, using characters and actions from games. This animation technique is commonly known as "machinima".

As users progress through games, they will achieve differing skill levels. The games played will report the accomplishments to the service control system 401, and these skill levels will be shown on User Pages.

To the extent a game is a multiplayer game, then it will be able communicate both to app/game servers 1521-1525 through the inbound routing 1502 network and, with a network bridge to the Internet (not shown) with servers or game machines that are not running in the hosting service 210. When playing multiplayer games with computers on the general Internet, then the app/game servers 1521-1525 will have the benefit of extremely fast access to the Internet (compared to if the game was running on a server at home), but they will be limited by the capabilities of the other computers playing the game on slower connections, and also potentially limited by the fact that the game servers on the Internet were designed to accommodate the least common denominator, which would be home computers on relatively slow consumer Internet connections.

But when a multiplayer game is played entirely within a hosting service 210 server center, then a world of difference is achievable. Each app/game server 1521-1525 hosting a game for a user will be interconnected with other app/game servers 1521-1525 as well as any servers that are hosting the central control for the multiplayer game with extremely high speed, extremely low latency connectivity and vast, very fast storage arrays. For example, if Gigabit Ethernet is used for the inbound routing 1502 network, then the app/game servers 1521-1525 will be communicating among each other and communicating to any servers hosting the central control for the multiplayer game at gigabit/second speed with potentially only 1 ms of latency or less. Further, the RAID arrays 1511-1512 will be able to respond very rapidly and then transfer data at gigabit/second speeds. As an example, if a user customizes a character in terms of look and accoutrements such that the character has a large amount of geometry and behaviors that are unique to the character, with prior art systems limited to the game client running in the home on a PC or game console, if that character were to come into view of another user, the user would have to wait until a long, slow download completes so that all of the geometry and behavior data loads into their computer. Within the hosting service 210, that same download could be over Gigabit Ethernet, served from a RAID array 1511-1512 at gigabit/second speed. Even if the home user had an 8 Mbps Internet connection (which is extremely fast by today's standards), Gigabit Ethernet is 100 times faster. So, what would take a minute over a fast Internet connection, would take less than a second over Gigabit Ethernet.

Figure 9A:
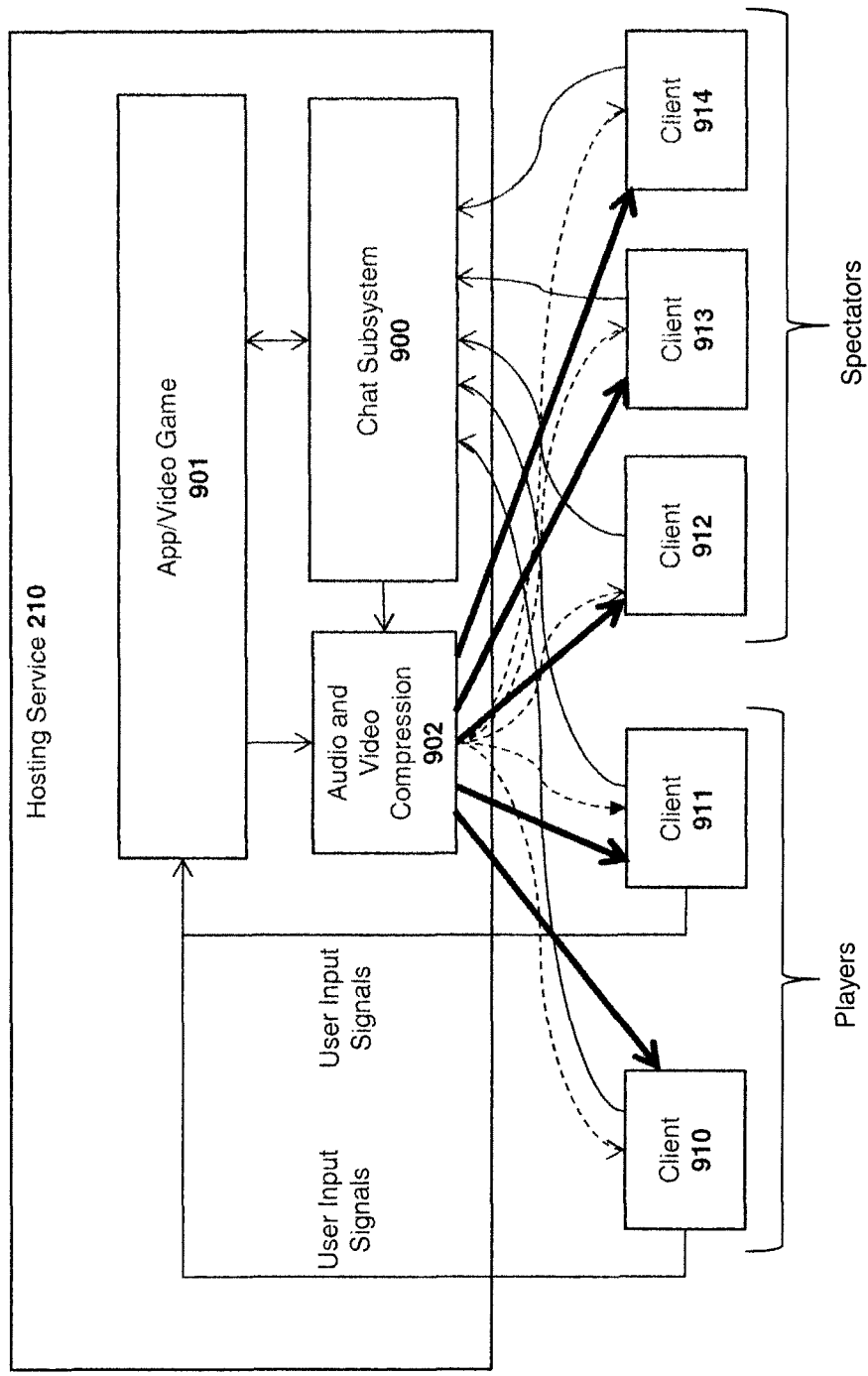
FIGS. 9a-b illustrate one embodiment of a system for providing audio chat functions for an online video game.

System and Method for Managing Voice Channels for Video Game Players and Spectators One embodiment of the invention supports voice chat sessions between specified groups of video game spectators and participants. As illustrated in FIG. 9a, in this embodiment of the invention, a chat subsystem 900 executed on one or more servers within the hosting service 210 manages multiple concurrent voice chat channels for each active video game. In the particular example shown in FIG. 9a, two players are playing an online video game on clients 910-911 and three spectators are watching the video game (or any other type of application) on clients 912-914. Thus, as described in the co-pending applications, in response to user input signals from client devices 910-911, the video game or other type of application 901 is executed by app/game servers 1521-1525 and audio/video generated by the video game/application is compressed using shared audio/video compression module 902. The compressed audio/video streams are then transmitted to each of the individual client devices 910-914 as previously described.

In another embodiment, an audio chat subsystem is executed on one or more servers external to the hosting service 210 connected by a network connection to the hosting service 210. In another embodiment, an audio chat subsystem is executed on one or more servers external to the hosting service 210 connected by a network connection to the client devices 910-914. In another embodiment, an audio chat subsystem is executed on one or more servers external to the hosting service 210 connected by a network connection to the hosting service 210 and the client devices 910-914. In another embodiment, an audio chat subsystem is executed on the client devices 910-914 (e.g., and executed in using peer-to-peer communication).

Although compressed audio is generally preferred so as to minimize bandwidth consumption, widely-available broadband connections have reached a point where uncompressed audio (to maintain the highest audio quality) can be carried in a practical configuration. Consequently, in one embodiment, either or both the application/game audio and the chat audio is uncompressed, and for all of the embodiments herein wherein "compressed" audio is referenced (except in regard to handling specific issues related to audio compression), uncompressed audio may be substituted.

Each of the clients' 910-914 may be equipped with varying degrees of processing power and network connectivity. As such, the shared audio/video compression module 902 may perform different levels of audio/video compression based on these capabilities prior to streaming the audio/video of the video game to each of the client devices 910-914. By way of example, a client device 912 with a low-bandwidth connection may receive audio/video compressed at a higher ratio than client device 914 with a relatively high-bandwidth connection, or a client device 912 with limited processing power for decompression may receive audio/video compressed at a higher ratio than client device 914 with relatively higher processing power. These and other compression techniques may be employed to uniquely compress audio/video content for each individual client as described in detail in the co-pending applications.

In one embodiment, the chat subsystem 900 establishes and manages a variety of audio chat communication "channels" between groups of active video game players on clients 910-911 and game spectators on clients 912-914. The chat subsystem 900 may be executed on the same app/game servers 1521-1525 which execute the online video game 901. However, the underlying principles of the invention are not limited to this configuration. For example, the chat subsystem 900 may be implemented on a separate server or group of servers, either internal or external to the hosting service 210 or on one or more client devices 910-914 while still complying with the underlying principles of the invention.

As illustrated in FIG. 9a, in one embodiment, the audio chat subsystem receives packetized audio streams from each of the clients 910-914, processes the audio streams according to the audio channel configuration (as described in detail below), mixes the audio streams for each channel, and provides the processed audio streams to the audio/video compression module 902. The audio/video compression module 902 then transmits the audio streams (shown in dashed lines) associated with each channel to the appropriate set of clients 910-914 as well as the compressed audio/video of the app or game (shown in straight solid lines).

Figure 9B:
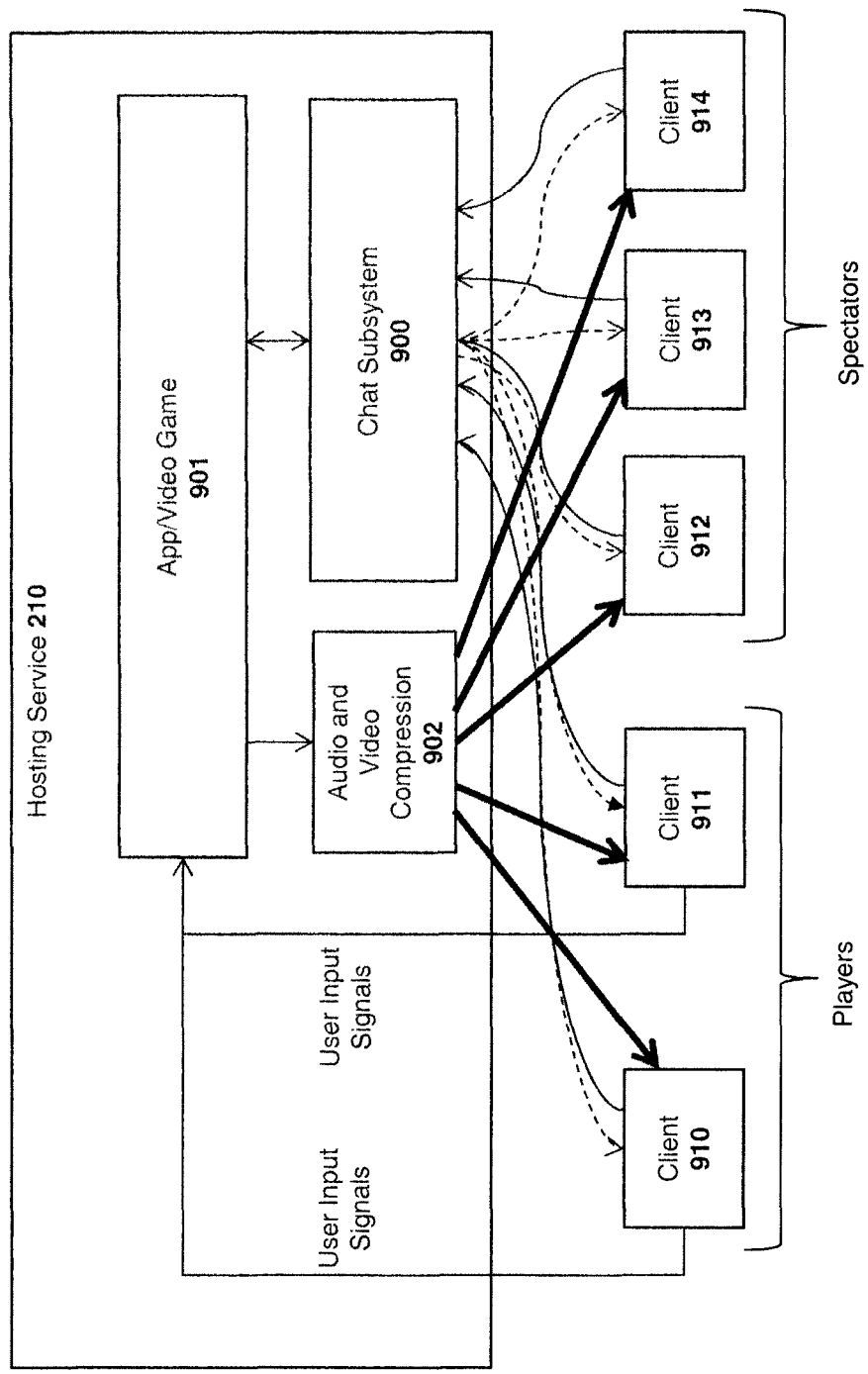

In an alternate embodiment illustrated in FIG. 9b, the audio streams processed by the chat subsystem 900 (shown in dashed lines) are processed and transmitted separately from the video game audio/video shown in solid straight lines (i.e., bypassing the audio/video compression module 902 used to compress the video game audio/video). In another embodiment, one or more user audio chat streams are transmitted to the chat subsystem using a different device than the client 910-914 being used for playing a game (e.g., using a separate audio communication channel). For example, if a client device, such as a PC, lacks a microphone, the user may instead use a mobile phone with a microphone and/or speaker to communicate with chat subsystem 900. The underlying principles of the invention are the same regardless of whether the audio chat channels are combined with or processed separately from the video game audio, and/or whether the audio channels for a given user all go through a single client device.

As mentioned above, in one embodiment, the chat audio is mixed with the app/video game audio, such that a client 910-914 receives a single audio stream. In another embodiment where the app/video game audio is multichannel (e.g. stereo, 5.1 surround, etc.), the chat audio is mixed with one, several, or all channels and such mixing occurs either within the chat subsystem 900, the app/video game 901, the audio and video compression subsystem 902, in a client 910-914, or in a mixing unit external to the aforementioned systems. In another embodiment the chat audio is independent from the app/video game audio, such a client 910-914 receives separate audio streams for the app/video game and the audio chat. Mixing can be implemented using any of many prior art audio mixing techniques including, for example, adding respective samples of pulse-code modulated (PCM) audio of each audio stream together, with or without sample-rate converting of one or both streams together, using any of many prior art sample-rate conversion techniques (e.g., resampling a PCM stream using a filter). In one embodiment, the mixing (including how and where the mixing occurs, and what the relative volume is of the mixed audio streams) is controlled automatically; manually via user control; by the hosting service 210; by the chat subsystem 900, by the app/video game 901; by one or more clients 910-914; or by other human or computing means external to aforementioned users and computing systems and applications.

In one embodiment the app/video game audio is directed to different audio playback devices than the audio chat audio. For example, the app/video game audio may be directed to speakers or headphones on a computer, TV, tablet or smartphone, while the audio chat audio may be directed to one or more headsets. In such a configuration, a user could hear chat conversation privately while others might overhear the app/video game audio. In a configuration where multiple users are sharing the same screen (e.g. in a multiplayer game where players in the same room are on different teams), chat audio may be sent to some players but not other players. In one embodiment, audio chat is sent separately from app/video game audio to some client devices, but mixed in others (e.g., if some players in the same room are on different teams, their chat audio may be separated, while players in the same room on the same team, or spectators not playing at all, may have their chat audio mixed with the app/video game audio).

In one embodiment, any of many well-known echo cancellation techniques are employed to mitigate echoing when a microphone used with voice chat is able to detect the voice chat audio output (e.g. from a speaker near the microphone). In another embodiment, the voice chat audio is muted when a user is speaking under either manual control (e.g. with a "push-to-talk" system) or under automatic control (e.g.

when the microphone volume level exceeds a specified threshold that would occur when the user is speaking).

In one embodiment, the audio chat subsystem 902 determines whether the audio content contained in the audio packets received from each client is above a specified energy threshold (i.e., above a specified volume). Packets containing audio with energy below the specified threshold are dropped and not mixed with audio from other clients and provided to the audio/video compression module 902. The audio packets for each channel with an energy level above the specified threshold are mixed together by the audio chat subsystem 900 and broadcast (whether by means of multicast, or as multiple unicast streams) to specified groups of clients. The chat audio may also be mixed with the video game audio in the embodiment shown in FIG. 9*a*. In addition to the processing described above, the chat subsystem 900, the app/video game 901, the audio and video compression subsystem 902 and/or one or more clients 910-914 may perform other audio signal processing operations on the audio streams such as filtering and echo cancellation.

In one embodiment, the processing operations include filters to disguise the voice of the user. For example, the user may wish to change their voice to seem like that of a video game character (e.g., an alien), to change gender, to hide the user's identity, etc. In one embodiment, some users hear the user's actual voice, whereas other users hear the user's modified voice. For example, teammates may hear the user's actual voice while opponents or spectators may hear the user's modified voice.

As mentioned briefly above, in one embodiment, the chat subsystem 900 establishes different audio chat "channels" for each player and spectator. Users associated with a particular chat channel are able to verbally communicate with other users within the same channel. Thus, one or more "player channels" may be established and maintained for the participants in a particular video game, thereby allowing different groups of players to chat with one another during gameplay. For a multi-player video game in which different teams of players compete, separate audio chat channels may be established for each team. In addition, the chat subsystem 900 establishes one or more "spectator channels" to allow spectators to communicate with other spectators and/or with players of the video game. In one embodiment, each player may choose to participate in a particular player channel and/or a particular spectator channel while non-players may only participate in spectator channels.

Figure 10:
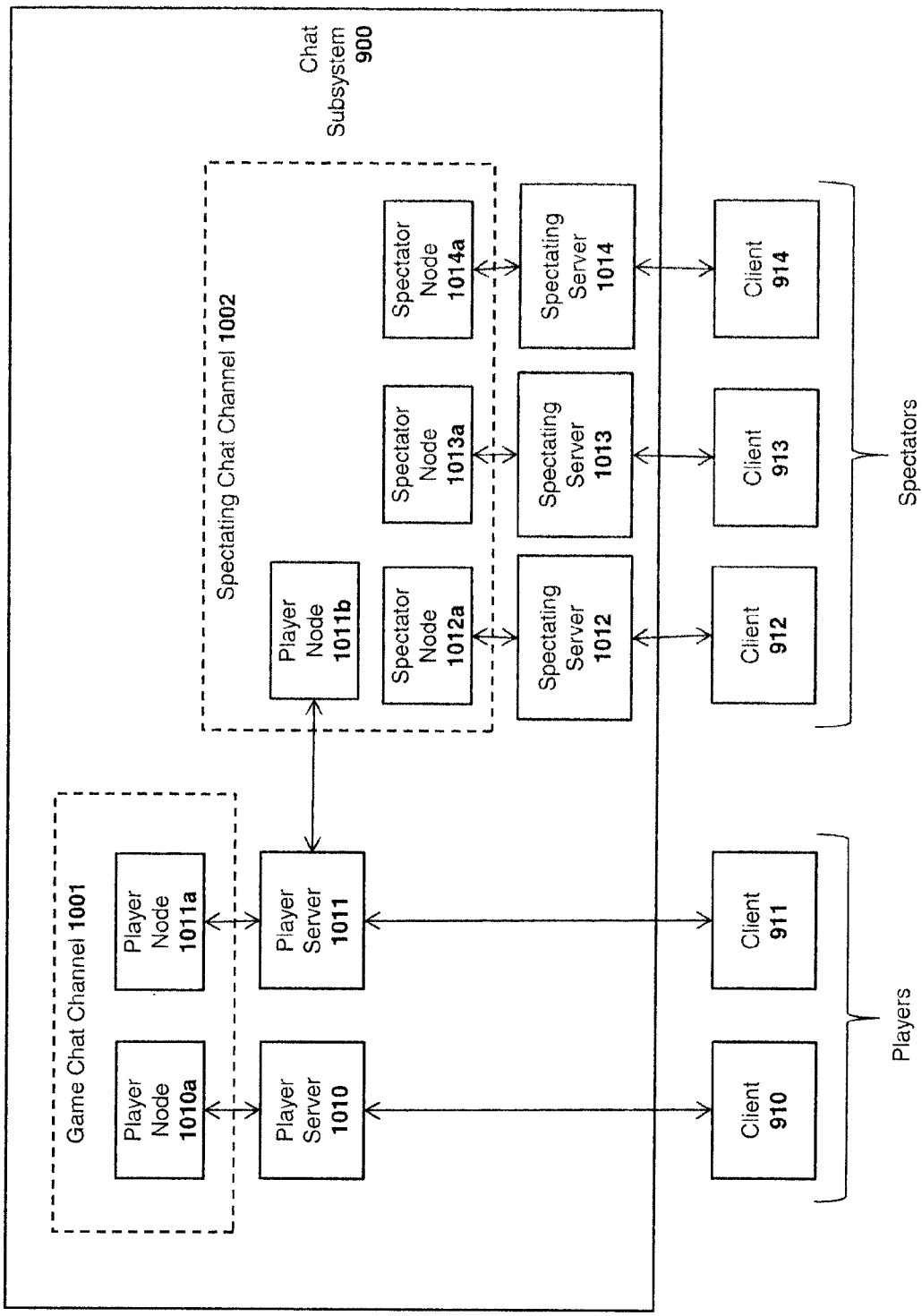
FIGS. 10-12 illustrate one embodiment of a system for managing voice chat channels.

As illustrated in greater detail in FIG. 10, in one embodiment, a server module 1010-1014 is executed to enable audio chat sessions with each individual client 910-914. The server modules 1010-1014 establish and tear down chat sessions in response to client requests and process the audio packets as described herein (e.g., dropping packets with audio below a specified energy level, performing echo cancellation, etc). In one embodiment, each chat session is implemented on top of a TCP socket between a server and its respective client. However, the underlying principles of the invention are not limited to any particular networking protocol. In the specific example shown in FIG. 10, player servers 1010-1011 are instantiated to support chat sessions with player clients 910-911 and spectating servers 1012-1014 are instantiated to support chat sessions with spectator clients 912-914. The player and spectator servers 1010-1014 are established when a user initially opens a chat session with a particular channel and are torn down when the user disconnects from the chat session.

As illustrated in FIG. 10, a "node" is a data structure used to associate a particular player and client with a particular chat channel. Each player/spectator server 1010-1014 is linked to a particular player/spectator node 1010*a*-1011*a*, 1012-1014 within a chat channel 1001-1002 (whether a game chat channel or spectating chat channel). For example, each node may identify the particular player or spectator associated with that node and the particular server currently supporting the chat session for that player or spectator. Although illustrated as separate player servers 1010 and 1011 in FIG. 10, both player servers may be combined into a single server to service both clients 910-911 while still complying with the underlying principles of the invention. In the particular example shown in FIG. 10, player nodes 1010*a* and 1011*a* are associated with game chat channel 1001 and player node 1011*b* and spectator nodes 1012*a*-1014*a* are associated with spectating chat channel 1002. Consequently, both players on clients 910-911 (associated with player nodes 1010*a* and 1010*b*, respectively) may chat over the game chat channel 1001, while the player on client 911 (associated with player node 1011*b*) and the spectators on clients 912-914 may chat over the spectating voice channel 1002. Thus, using the techniques described herein, a player may choose to participate in one or more player chat channels and spectating chat channels whereas spectators are limited to participation in spectator chat channels. In one embodiment, a spectator may also be invited and/or permitted to participate in a game chat channel (i.e., if permitted by one of the players or a system administrator). In one embodiment, a spectator may be permitted to listen to, but not talk on, one or more player channels (e.g., if the spectator's comments might interfere with the game play, or if there are too many spectators and the noise might create cacophony).

Figure 13:
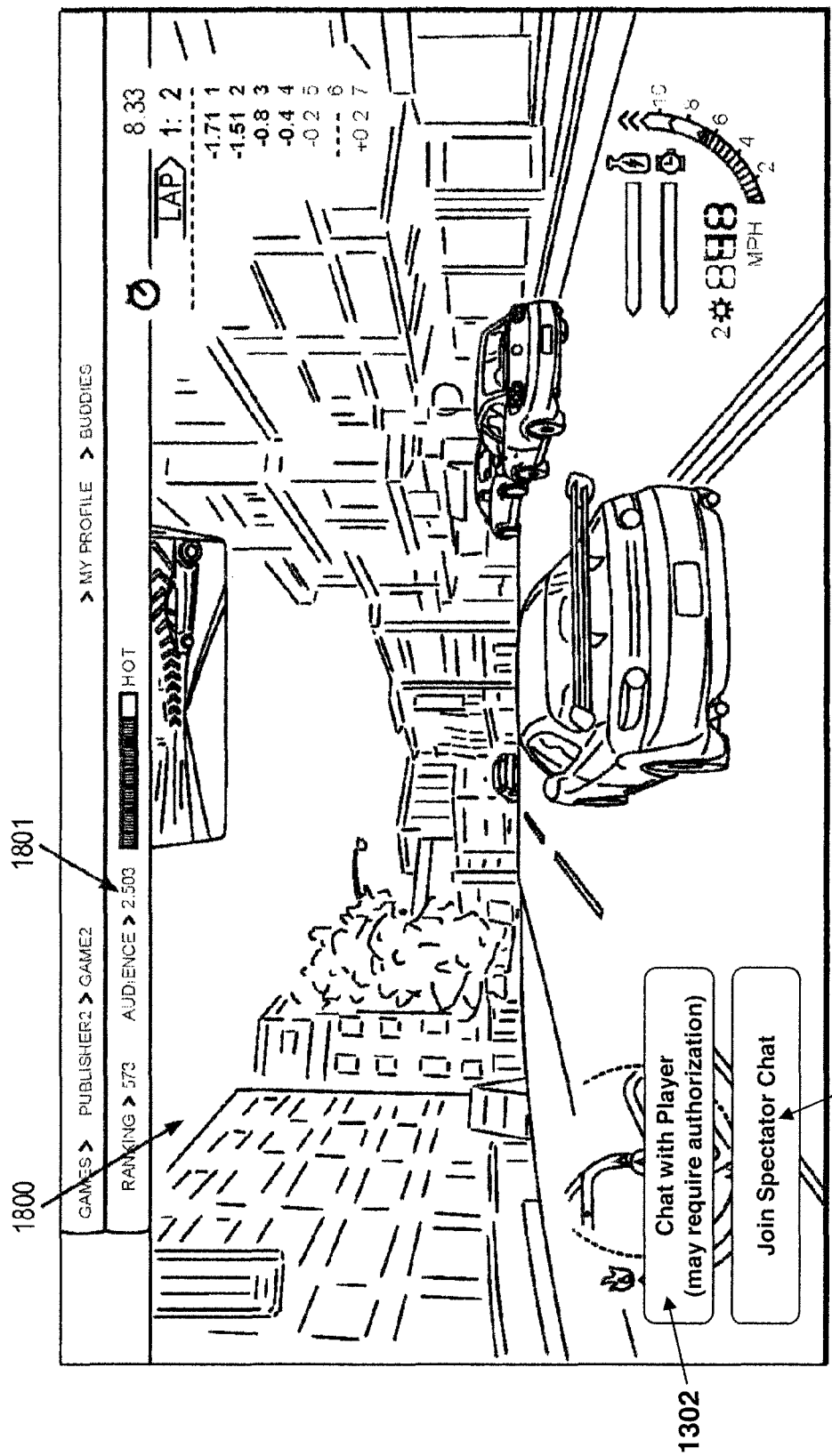
FIG. 13 illustrates one embodiment of a graphical user interface for joining a voice chat channel of an online video game.

Each player and/or spectator may open and close audio chat channels via a set of graphical user interface features provided in the form of an interactive web page or other type of user interface (UI), whether graphical, gestural, auditory, etc. For example, as illustrated in FIG. 13, a button 1301 (or other graphical selection element) within the graphical UI may provide the spectator with an option to "join" the spectator chat channel. In one embodiment, another button 1302 may be provided to allow the spectator to chat with a particular player who has not currently joined the spectator channel (assuming that the spectator is authorized to do so). For example, in one embodiment, a player may configure the chat system to allow the player's "friends" to request an audio chat session with the player. Thus, if a particular spectator is listed as one of the player's friends, the option to chat with the player may be provided (as shown). In one embodiment, if the spectator does not have authorization to chat with the player, the button for this option 1302 may be grayed out and/or may not be shown in the UI. Various alternate UI features, for example, controlling the volume of chat audio or muting players who are in noisy environments, may be implemented to enable and/or control chat sessions between spectators and players while still complying with the underlying principles of the invention In the embodiment shown in FIG. 11, a "coach" audio chat channel 1003 has been established between the player of client 910 and a "coach" connected via client 1110 and server 1111. In this embodiment, a "coach" (e.g., an experienced player) may enter into a chat session with another (typically less experienced) player using the coach chat channel 1003. The more experienced player may then coach the less experienced player as the less experienced player plays the video game. Thus, for this embodiment, a "coach" node 1112*a* is used to associate the coach with the coach chat channel 1003 and a player node 1010*b* is used to associate the player with the coach chat channel 1003.

Figure 11:
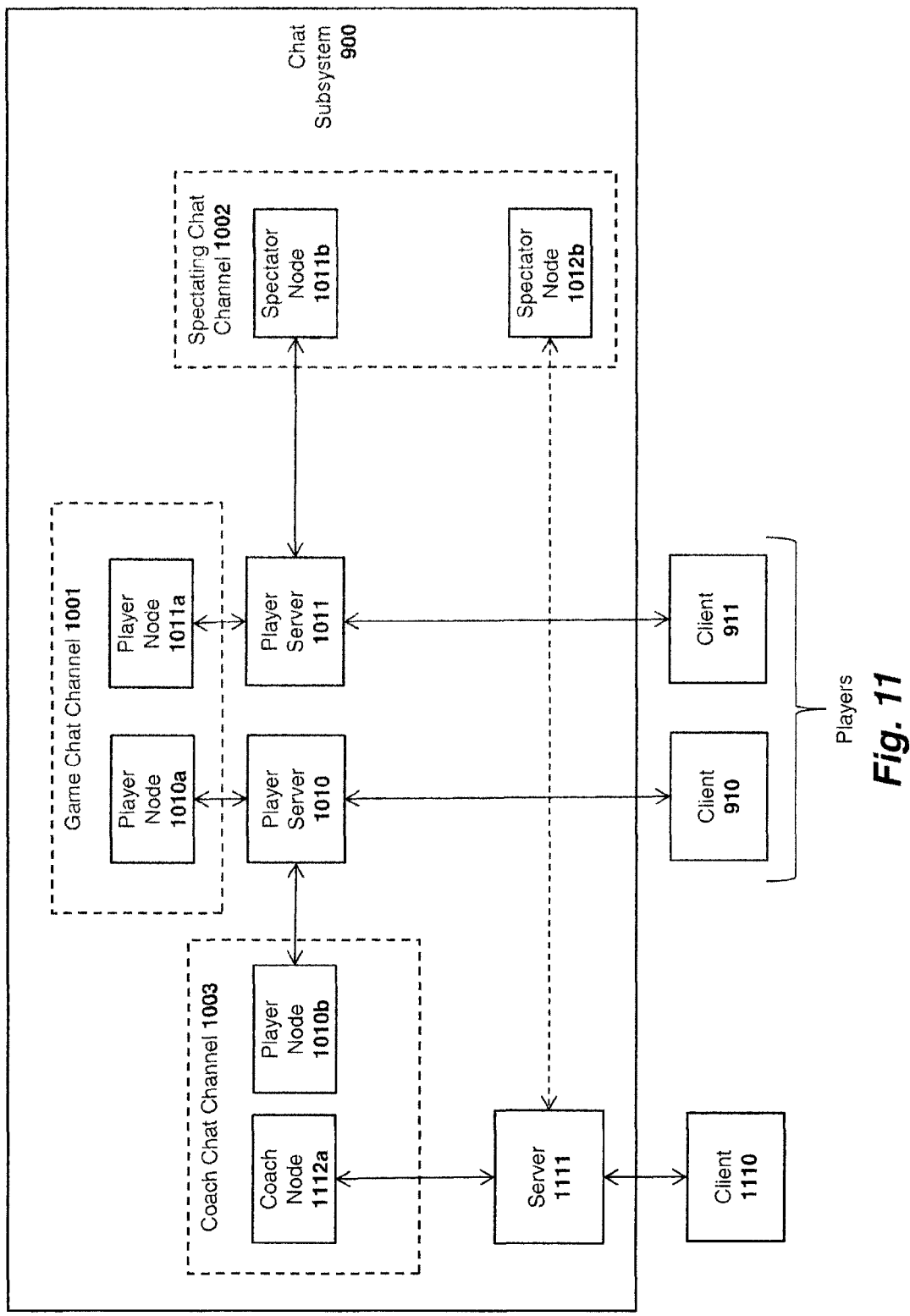

Consequently, a chat audio stream transmitted from client 1110 will be sent to the player's client 910 (after audio processing by server 1111) and a chat audio stream transmitted from client 910 will be sent to client 1110 (after audio processing by server 1111). As illustrated in FIG. 11, the "coach" user may also join the spectating chat channel 1002 to listen and communicate with spectators to the video game.

In another embodiment the "coach" is a computational entity, such as an audio subsystem driving by an artificial intelligence system. In another embodiment, the "coach" entity, whether computational entity or human entity, is helping one or more users with a non-video game application, perhaps in an instructional capacity, Just because a particular player, coach, or spectator is associated with a particular chat channel does not necessarily mean that the player, coach or spectator wants to currently listen to all of the chat audio communicated over that channel. Accordingly, in one embodiment, players, coaches, and/or spectators have the ability to mute other players, coaches, and/or spectators (e.g., via a selectable mute option provided within the UI). In addition, in one embodiment, players, coaches and spectators are provided with the ability to mute specific users. For example, if a particular spectator is taunting a player, then the player can mute that particular spectator (while still listening to audio communication from other spectators). In response to the mute function, the server associated with the player will drop packets from the spectator who has been muted. Of course, the player may choose to temporarily mute the entire spectating channel or remove himself or herself from the chat channel altogether (e.g., so that the user may concentrate on the game).

Figure 12:
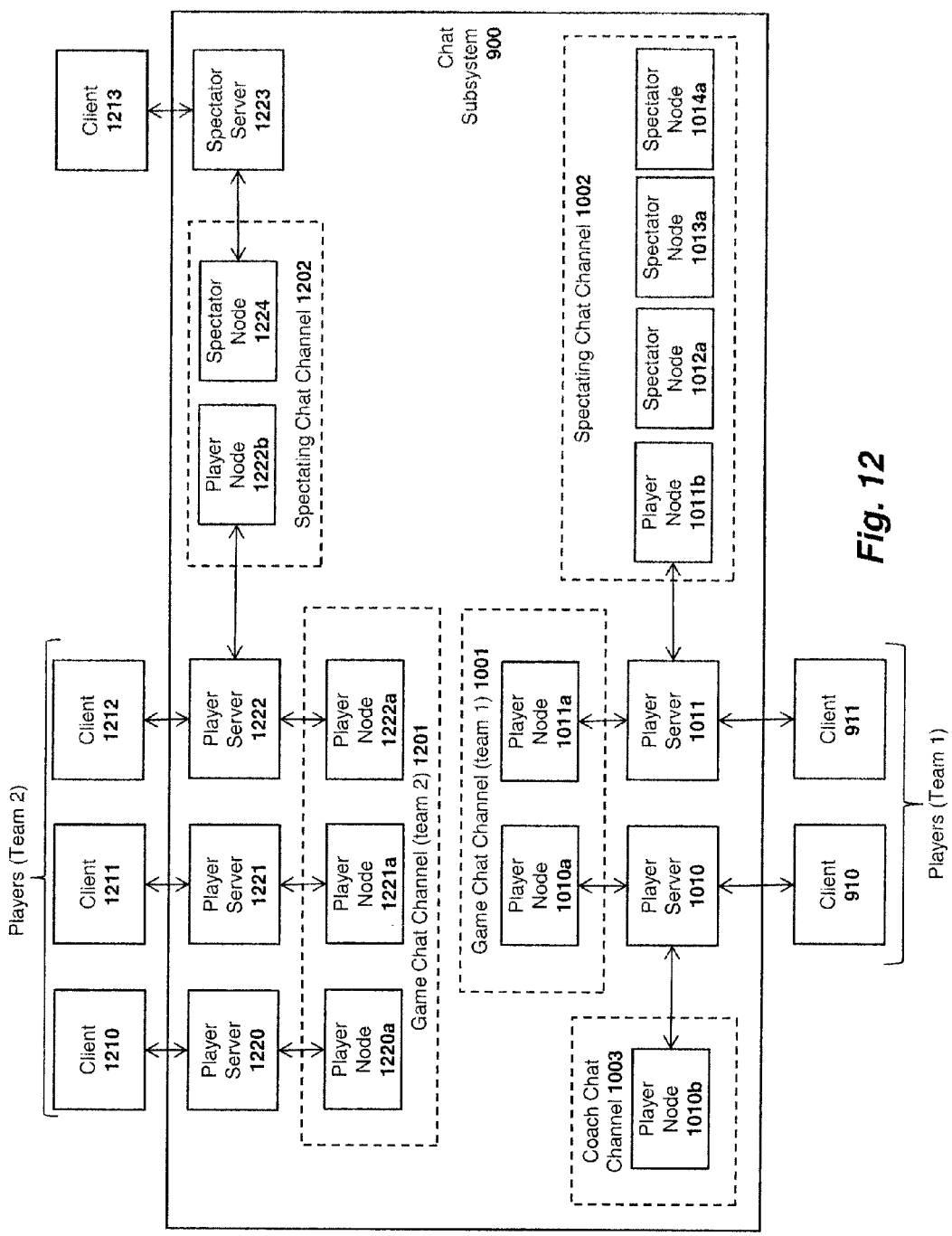

FIG. 12 illustrates one embodiment of the invention in which two separate game chat channels (1001 and 1201) are opened for a particular video game: a first game chat channel 1001 for a first team, and a second game chat channel 1201 for a second team. Thus, players playing on "team 1" from clients 910-911 are able to chat with one another via game chat channel 1001 and players playing on "team 2" from clients 1210-1212 are able to chat with one another via game chat channel 1201 (i.e., via player servers 1220-1222 and nodes 1220*a*-1222*a*, respectively). In addition, as illustrated, two separate spectating chat channels are established: spectating chat channel 1002 and spectating chat channel 1202. This configuration may be used, for example, to segregate spectators rooting for the two different teams. For example, the spectators connecting via spectator nodes 912-914 may be rooting for team 1, and the spectator connecting via client 1213, server 1223 and node 1224 may be rooting for team 2. In addition, in this particular embodiment the player playing the video game via player server 1222 is associated with the spectating chat channel 1202 via node 1222*b* and is associated with game chat channel 1201 via player node 1222*a*.

The game chat channel architecture described above provides significant flexibility when configuring audio chat channels for each game. The specific manner in which game channels, spectator channels, and coach channels are configured may vary depending on game type and may be controlled by the game designers and/or administrators of the hosting service 210 and/or another entity, be it a computing entity such as a server or human entity, such as a user or policy administrator. In addition, as previously described, players and/or spectators may be provided with options for controlling their own audio chat sessions and the audio chat sessions of others (e.g., based on specified authorization levels). In one embodiment, for example, a game administrator, perhaps working on behalf of the hosting service, may be designated to provide complete control over the game, spectator or coach chat channels and/or the players. In addition, as previously mentioned, each spectator and/or player may limit chat sessions to those players with whom the spectator and/or player is "friends" with on the chat service.

The audio chat architecture described above is capable of supporting a variety of audio chat applications, both for games and applications. For example, in one embodiment, moderated spectating chat sessions may be implemented in which the player being spectated or another designated player becomes a moderator to the spectating channel. This moderator is provided with the authority to control who is speaking and provides the unique ability for an instructor or celebrity player to discuss a game as it is being played or an application being taught or demonstrated and to take questions from the players engaged in the spectating voice chat session. In operation, when the moderator admits a spectator or player to a chat session, a player/spectator node associated with that spectator/player is added to the chat channel for that session. Once the node is established, the moderator is provided with the ability to select a player, spectator, and/or himself, to speak or ask questions. In one embodiment, those players/spectators who are not currently selected to speak are muted (i.e., audio packets received from those players/spectators are not processed and mixed together to form the chat audio stream for the chat channel and broadcast to other players/spectators). In one embodiment, spectators and/or players are automatically muted when the moderator is not currently granting them permission to speak. In this way, audio chat may be controlled in a reasonable way, even with hundreds or potentially thousands or more of spectators.

In another implementation, the chat architecture described herein may be used to support chat sessions between small groups of users. For example, the "friends" lists of each of the players of a video game may be queried to determine a set of spectators who are permitted to chat with the players via a spectator or player chat channel. In this implementation, a private spectator chat channel may be established for the players' friends and the players and a public chat channel may be established for all other spectators. The public chat channel may then be moderated as described above to designate the spectators who can chat over the public channel at a given point in time.

In another embodiment, a multi-player spectating chat channel may be established that allows the spectating players to not only communicate with the player that they are currently spectating but the entire set of players in a multi-player game, or players on a certain team in a multiplayer game. In this embodiment, the spectating players can communicate with each other over the spectator chat channel, and communicate with all of the players via the multiplayer chat channel for the game being spectated through the eyes of a single player. Each of the players may, of course, mute the multiplayer chat channel or choose to listen to only certain spectators connected to the multiplayer chat channel. In one embodiment, each spectating player may choose which player in a multiplayer game they wish to spectate, and may jump from spectating one player to spectating another, and then another, etc., even though all spectators are communicating over the same multiplayer spectating chat channel. The player will be able to select which player to spectate with a Multiplayer Spectating Roster or other mechanism to change views to a different player. Additionally, the multiplayer spectating voice chat may support both the "coach" mode and moderated spectating chat session capabilities described above.

In one embodiment, the chat subsystem 900 may assign different priority levels to each of the audio chat channels or to individual players and spectators. For example, the player chat channels may be provided with a higher priority than spectator chat channels. Consequently, the audio packets received from players within the player chat channel may be processed ahead of audio packets received from the spectators, thereby ensuring lower latency for the player audio chat channels. Various well known quality of server (QoS) packet queuing techniques may be implemented to ensure that player chat packets receive priority treatment over spectator chat packets. This configuration may be particularly beneficial for certain multi-player games which require players to communicate efficiently (e.g., as part of a team in a "first-person shooter" game).

In one embodiment, a low-latency audio codec is used for audio chat streams, such as Constrained Energy Lapped Transform (CELT) or other prior art codecs. In another embodiment, an error-tolerant codec is used for audio chat streams. CELT is an example of one in addition to other prior art codecs. In another embodiment, error correction techniques are used in connection with the audio chat stream, whether compressed or uncompressed, such as any of many prior art techniques, including forward error correction. In another embodiment, a given codec and/or error concealment and/or error correction technique is used for the voice chat stream from the user to the chat subsystem 900 or other voice chat stream destination, as described herein, and after that voice chat stream is processed, mixed and/or transformed, a different codec and/or error concealment and/or error correction technique is used for the voice chat stream for delivery to a different user.

In one embodiment, when a first user seeks to connect with a second user with voice chat, if the second user is unavailable or unwilling to accept a voice chat session at that time, the first user is so notified of the unavailability (either explicitly, or implicitly, e.g., by the fact the chat session is not initiated) and is given an opportunity to leave a voice message for the second user. This capability may also be made available if the user seeks to connect to a channel associated with a group, e.g., a team of players, that does not or cannot accept a voice chat session, in which case the voicemail would be left for the group, and could be heard by one or all members of the group. In one embodiment, such voicemail messages would be sent as an email or other message (either as an attached or embedded audio file or as a link that will play the voicemail message) to the intended recipient(s). In one embodiment the voicemail would be transcribed with any of many prior art voice-to-text systems. In one embodiment, such voice-to-text systems would translate to another language. In another embodiment, such voice-to-text systems, whether in the original language or in a translation, would be presented to the recipient(s) as a voice through any of many text-to-voice systems.

In one embodiment, a given user's voice chat stream would be translated to one or more other languages in real-time as the voice is spoken, and presented in the preferred language(s) to one or all recipients. In another embodiment, a given user's voice chat stream would be presented in text form to one or all users using one of many prior art voice-to-text systems. In one embodiment, the voice-to-text would be translated into the preferred language(s) to one or all recipients.

In one embodiment, video chat channels are optionally associated with voice chat channels. In one embodiment, a video camera, either coupled to the same client 910-914 used for playing a game, using an app and/or spectating a app/video game, or coupled to a separate client 910-914 than used by a given user for playing a game, using an app and/or spectating an app/video game, captures the video of a user who is chatting and creates a video stream which is transmitted to the chat subsystem 900. In an alternative embodiment, a video or image who is not the user (e.g. a computer-generated character, an prerecorded or live image/video, an animation, or a transformation (such as a warping) of the video of the user), is presented as a video chat stream instead of a video of the user. In one embodiment, a computer-generated character is presented where the character's animation is controlled in whole or in part by the audio spoken by the user (e.g. the mouth of a computer-generated character is shaped based on phonemes derived from the spoken audio using any of many prior art phoneme recognition techniques). In another embodiment, different users will be presented with different video streams for the video chat. For example, teammates may see the user's actual face, whereas opponents or spectators may see an alternative image or video in the place of the user's actual video.

The video of the voice chat may appear as a window 1900 in FIG. 7 or a window 2000 in FIG. 8 on the display of another player or spectator. Or, the user may appear full screen. In another embodiment, the video of the user may be presented through a different client 910-914 than used by a given user for playing a game, using an app and/or spectating an app/video game. The video may be opaque, or translucent when it is presented over existing video on the display. The user that is the source of the video chat may also have a video window of himself or herself on his or her own display, for example, to be sure the user's face or body remains within the camera's field of view as captured for the video chat.

Video chat would normally have an audio chat stream associated with it, and would be subject to the routing and controls described herein with audio chat streams. For example, a video chat stream from one user may be enabled or disabled from being viewed by one or many users for any of the reasons described herein for an audio chat stream. For example, a user may decide to block a chat stream, or a chat stream may be enabled or blocked because the user is/isn't part of a team, is/isn't a "friend", as a matter of policy, by a moderator, by an administrator, or when a user starts/stops speaking. A "coach" (as a computer-generated entity or live human entity) may appear in a video window and provide help or advice to a user for a video game or application.

Because of the higher bandwidth associated with video relative to that of audio, video chat streams are likely to be compressed. With video chat, as with prior art video teleconferencing systems, minimizing latency is preferable, but as described in the co-pending applications, the latency requirements of video teleconferencing is not as tight as the latency requirements for twitch-action video games. As such prior art video teleconferencing codecs can be used in addition to the twitch video game-latency codecs described in the co-pending applications. Regardless of the codec used, it is preferable that the latency of the audio chat stream (e.g. through buffering) would by synchronized with that of the video chat stream to maintain "lip sync" between the audio and the video.

Once each video chat stream (typically compressed) is received (depending on the embodiment) by the chat subsystem 900, app/video game 901, audio video compression 902, client 910-914, or a subsystem external to the hosting service 210 and the clients' 910-914, the video window from each video chat stream must be merged with (or replaces) the video presented to a user receiving the video chat stream. This can be implemented within the app/game server 1521-1525 in FIG. 3, in the audio and video compression subsystem 902, or in a client 910-914. In the case where the video chat stream is compressed, it may be transmitted to a given user's client 910-914 in compressed form to be decompressed and merged with the other video presented in a client, or it can be transmitted to a given user's second client 910-914 with the video decompressed on a second device. For example, the user may be playing a video game on a TV that lacks a camera, while the video chat session is through a mobile phone or tablet with a camera. In one embodiment, the video is decompressed by the app/video game 901 or other software running in connect with the app/video game 901, and the video chat session is then presented as an overlaid opaque or translucent window, perhaps with a geometric transformation to shape the window, or perhaps displacing the entire screen. Or, the same operations in the preceding sentence may be performed by the audio and video compression subsystem 902. In the case of the preceding two sentences, the video chat stream may either be merged into the uncompressed app/video game video which is then compressed as a video stream and sent to one or more clients 910-914, or it may remain a separate compressed video stream sent to one or more clients 910-914.

In one embodiment, only the audio part of a video chat session is presented to one or more users. This may occur for any of a number of reasons. For example, the user may not be willing or able to allocate space on the display (e.g. if it might cover up part of a game or app), the user may not have enough bandwidth for the video stream if it is sent separately (or in the case of an app which has little motion, a chat video window with a great deal of motion might significantly increase the bandwidth (as described in the teachings of the co-pending applications), whether or not part of the app/video game video stream), there may be concern that inappropriate video (e.g. nudity) will be presented, video may only be enabled if the recipient pays for a particular service tier, etc.

In one embodiment, when a first user seeks to connect with a second user with voice chat, if the second user is unavailable or unwilling to accept a video chat session at that time, the first user is so notified of the unavailability (either explicitly or implicitly, e.g., by the fact the chat session is not initiated) and is given an opportunity to leave a recorded video message ("video mail") for the second user. This capability will also be made available if the user seeks to connect to a channel associated with a group, e.g. a team of players, that does not or cannot accept a video chat session, in which case the video mail would be left for the group, and could be viewed by one or all members of the group. In one embodiment, such video mail messages would be sent in an email or other form of message (e.g. as an attached or embedded video file, or with a link that will play the video) to the intended recipient(s). In one embodiment, the audio portion of the video mail would be transcribed with any of many prior art voice-to-text systems. In one embodiment, such voice-to-text systems would translate to another language. In another embodiment, such voice-to-text systems, whether in the original language or in a translation, would be presented to the recipient(s) as a voice through any of many text-to-voice systems.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, and input devices have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A system for managing chat sessions for online video games comprising:
an online video game execution engine on a hosting service configured to, execute an online video game, in response to selection of the online video game for game play received from one or more players over a network;
responsively generate audio and video data of the online video game, the audio and video data being generated based on input received from the one or more players interacting with the online video game, wherein the input for the online video game is received from remote client devices associated with the one or more players;
transmit the generated audio and video data of the online video game to the remote client devices of the one or more players;
a chat subsystem of the hosting service configured to establish chat sessions with the one or more players playing the online video game and between a coach and a specific one of the players playing the online video game, the chat subsystem configured to,
establish a plurality of chat channels including,
a player channel over which the players participate in chat, wherein the player channel is associated with specific one of the players and a client device of the specific one of the players through a corresponding player node, and
a coach channel over which the specific one of the players and a coach of the online video game participate in chat, wherein the coach channel is associated with the coach and a client device of the coach through a corresponding coach node and the specific one of the players is associated with the coach channel through corresponding player node of the specific one of the players; and
manage the plurality of chat channels that includes the player channel and the coach channel, concurrently.

2. The system of claim 1, wherein the chat subsystem further includes,
a spectator channel over which spectators participate in chat, wherein the spectator channel is associated with a particular spectator and a client device of the particular spectator through a corresponding spectator node,
wherein the online video game execution engine is configured to transmit the generated audio and video data of the online video game to remote client devices of the spectators.

3. The system of claim 2, wherein the coach and the client device of the coach are communicatively linked to the spectator channel through the coach node.

4. The system of claim 1, wherein the coach is a computational entity driven by an artificial intelligence system.

5. The system of claim 1, wherein the coach is a spectator or another player.

6. The system of claim 1, wherein the coach is provided with an option to control the online video game of the specific one of the players, during game play.

7. The system of claim 1, wherein the coach channel is an audio chat channel or a video chat channel, and wherein the player channel is an audio chat channel or a video chat channel.

8. The system of claim 1, wherein the chat subsystem is further configured to extract audio portion of select ones of the chat, process the audio portion and forward the audio portion to select ones of the players or the coach, wherein the select ones of the chat are from the player channel or the coach channel.

9. The system of claim 8, wherein the chat subsystem includes filters, wherein the filters are used to disguise a voice detected in the audio portion.

10. The system of claim 8, wherein the chat subsystem includes a voice-to-text conversion logic to convert the audio portion of the chat to text and wherein the voice-to-text conversion logic includes a translation logic that is configured to translate audio portion of the chat to text in another language than a language in which the audio is spoken.

11. The system of claim 1, wherein the chat of a player or the coach includes a video of the player or the coach chatting, the video is provided as a video stream to the chat subsystem.

12. The system of claim 1, wherein the chat associated with the player or the coach channel includes a video of a computer-generated character, the video capturing animation of the computer-generated character in whole or in part based on audio spoken by the respective player or the coach.

13. The system of claim 1, wherein the chat subsystem is configured to forward a chat stream of the chat to the specific one of the players on a different client device than the client device used by the specific one of the players for playing the video game.

14. The system of claim 1, wherein when a new player or a new coach is admitted to a chat session, a player node or a coach node associated with the new player or the new coach is added to a corresponding player channel or coach channel for the chat session.

15. A method for managing chat sessions for online video games comprising:
executing an online video game using an online video game execution engine of a hosting service, in response to input from one or more players of the online video game, the executing includes responsively generating audio and video data of the online video game based on the input received from the one or more players interacting with the online video game using remote client devices and forwarding the audio and video data of the online video game to respective ones of the remote client devices of the one or more players for rendering; and
establishing, using a chat subsystem at the hosting service, chat sessions with the one or more players and between a coach and a specific player, wherein establishing comprises setting up a plurality of chat channels and managing the plurality of chat channels concurrently, wherein the plurality of chat channels includes a player channel over which the one or more players participate in chat, and a coach channel over which the specific player and the coach participate in chat,
wherein managing the plurality of chat channels includes assigning a priority level to each of the players, the specific player and the coach that have joined the corresponding chat sessions, the priority level used to set a priority for processing data packets received from each of the players, the specific player or the coach.

16. The method of claim 15, wherein managing the plurality of chat channels further includes providing options to allow the one or more players of the online video game to join and participate in the chat carried over the player channel.

17. The method of claim 15, wherein establishing the chat sessions further includes establishing a spectator channel over which one or more spectators of the online video game participate in chat.

18. The method of claim 17, wherein managing the plurality of chat channels further includes providing options to the coach to participate in the chat carried over the spectator channel.

19. The method of claim 15, wherein managing the plurality of chat channels further includes,
   extracting audio portion of select ones of the chat, processing the audio portion and forwarding the audio portion to select ones of the players or the coach.

20. The method of claim 19, further includes filtering the audio portion of the select ones of the chat to disguise a voice captured in the audio portion, the filtered audio portion forwarded to the select ones of the players or the coach.

21. The method of claim 15, wherein managing the plurality of chat channels further includes,
   presenting the chat of the one or more players to another player or a second coach that requests to join the chat sessions, wherein the player channel and the coach channel allow audio chat or video chat, wherein the chat presented may be the audio chat or the video chat.

22. The method of claim 15, wherein managing the plurality of chat channels further includes merging a chat of a selective player or the coach with game play data of the online video game, wherein the chat of the selective player or the coach may be an audio chat or a video chat.

* * * * *